Aug. 5, 1952  I. GHERTMAN ET AL  2,605,964
RECORD CONTROLLED MULTIPLYING MACHINE
Filed June 19, 1948  16 Sheets-Sheet 1
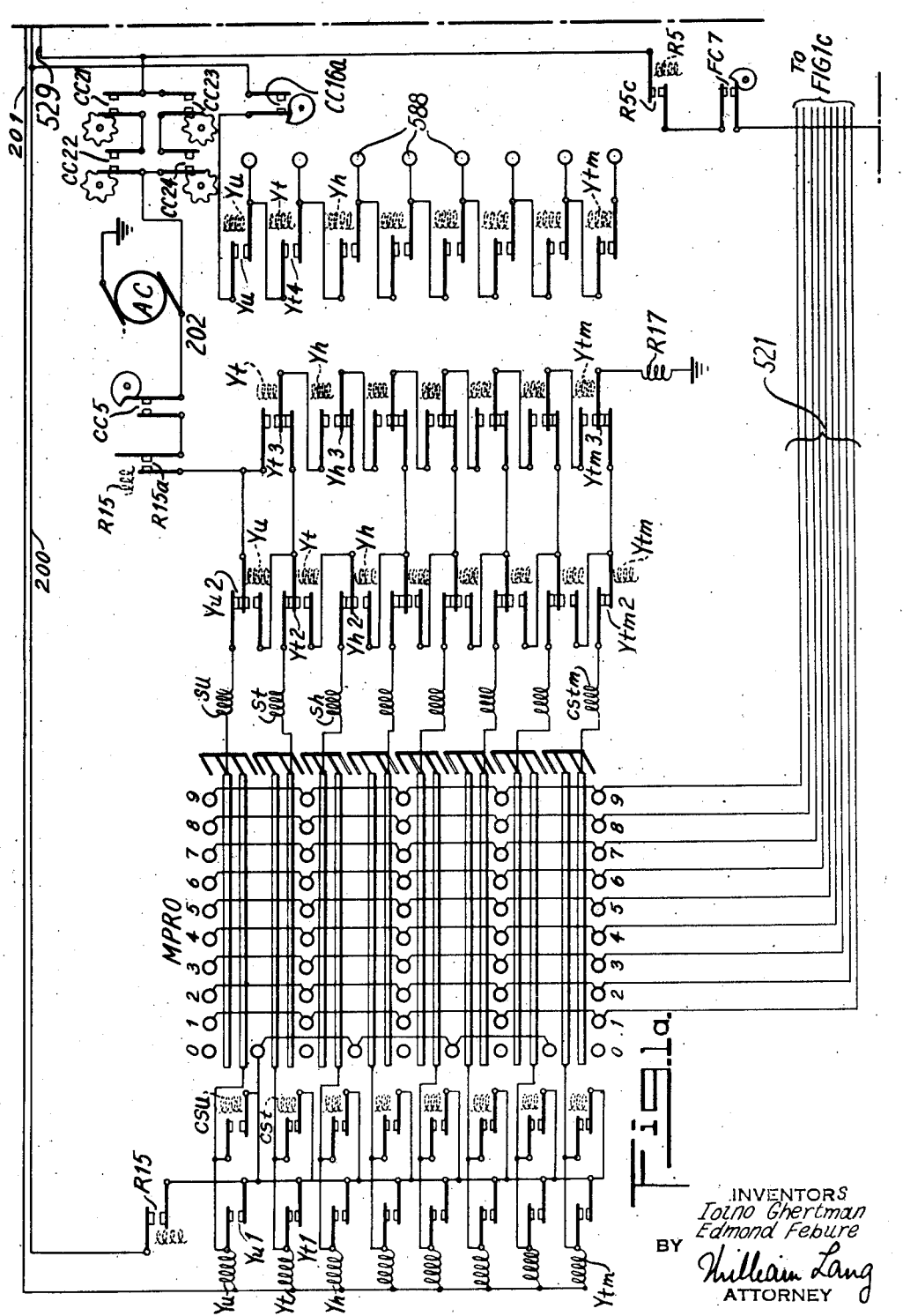

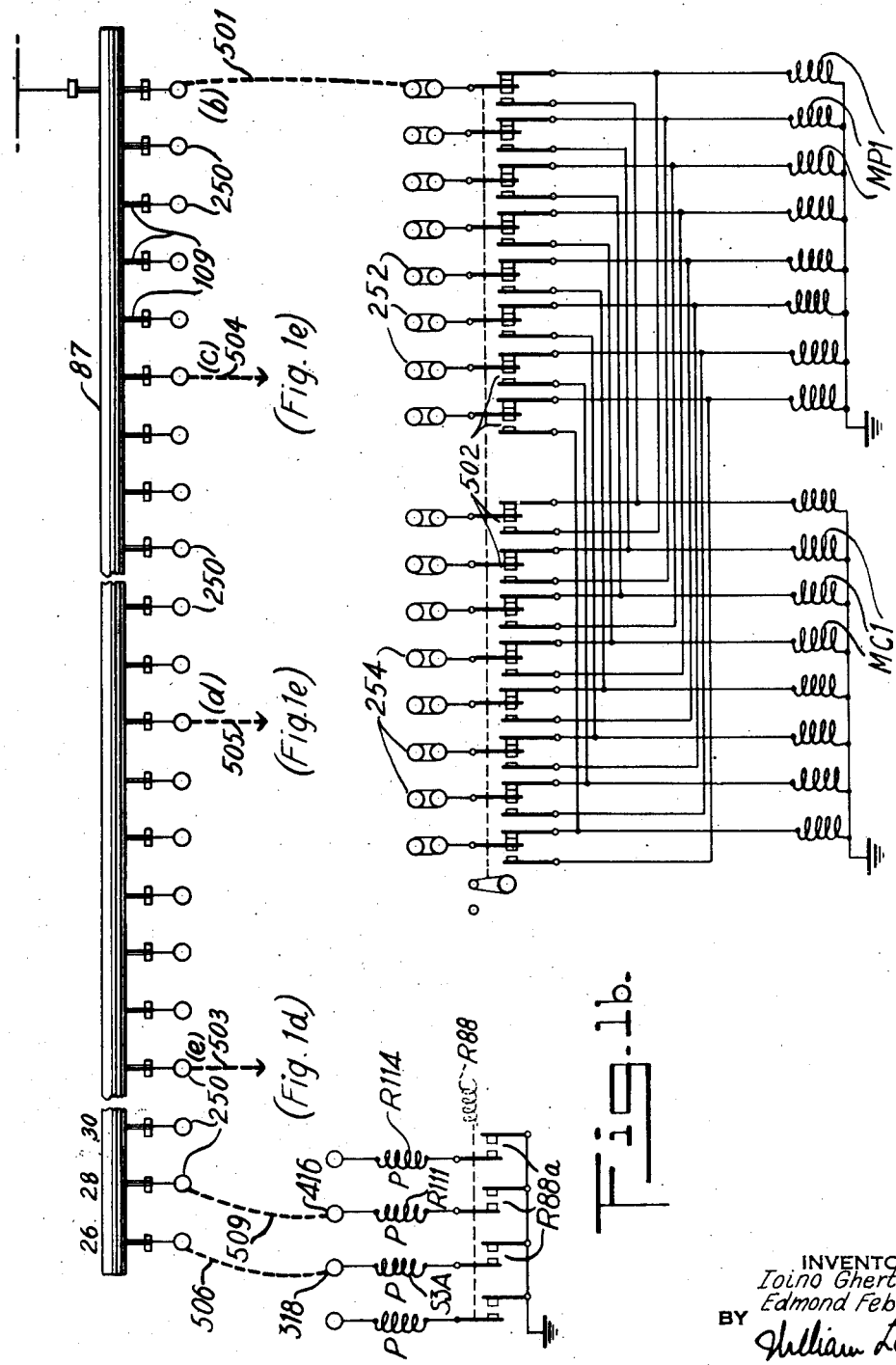

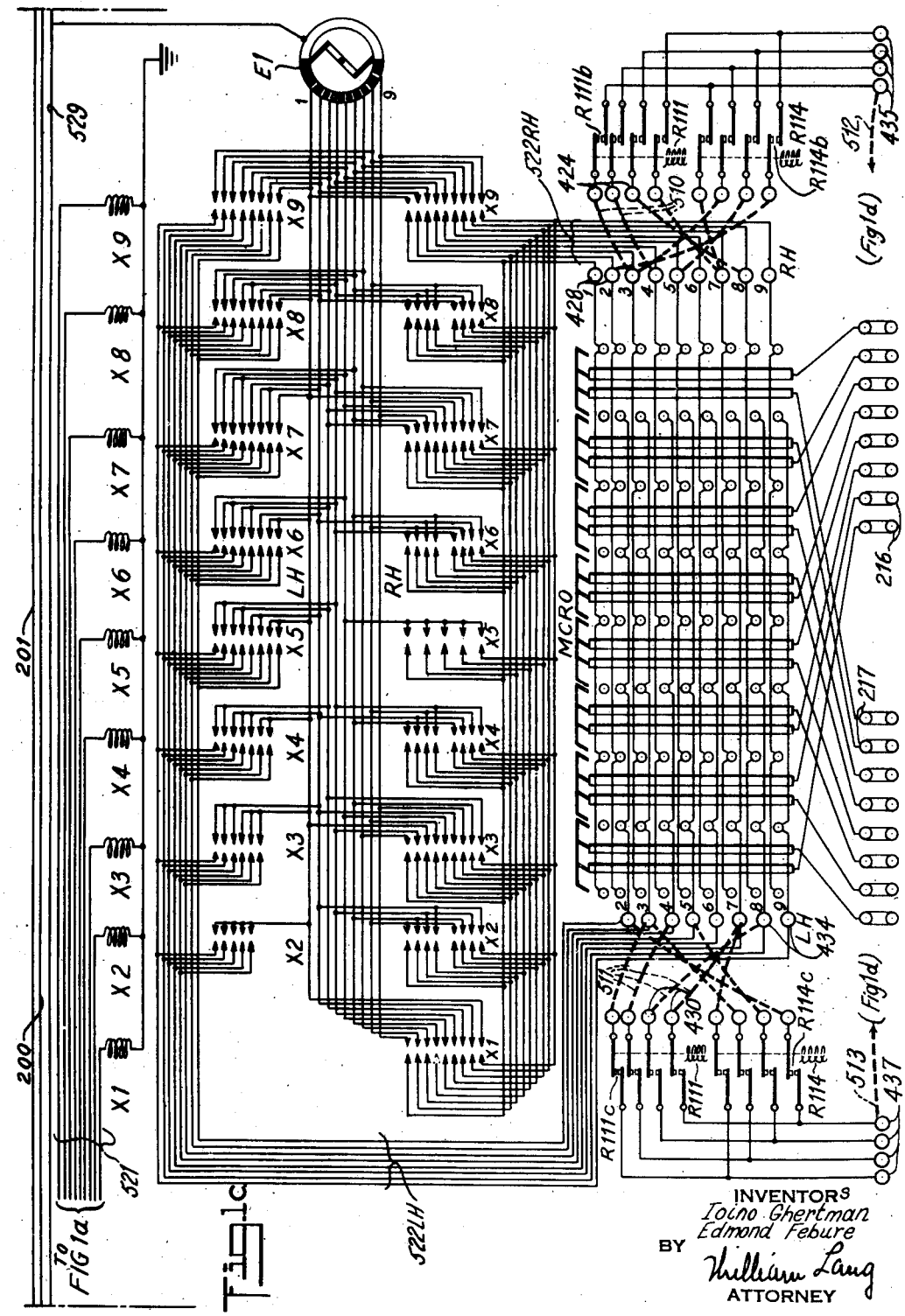

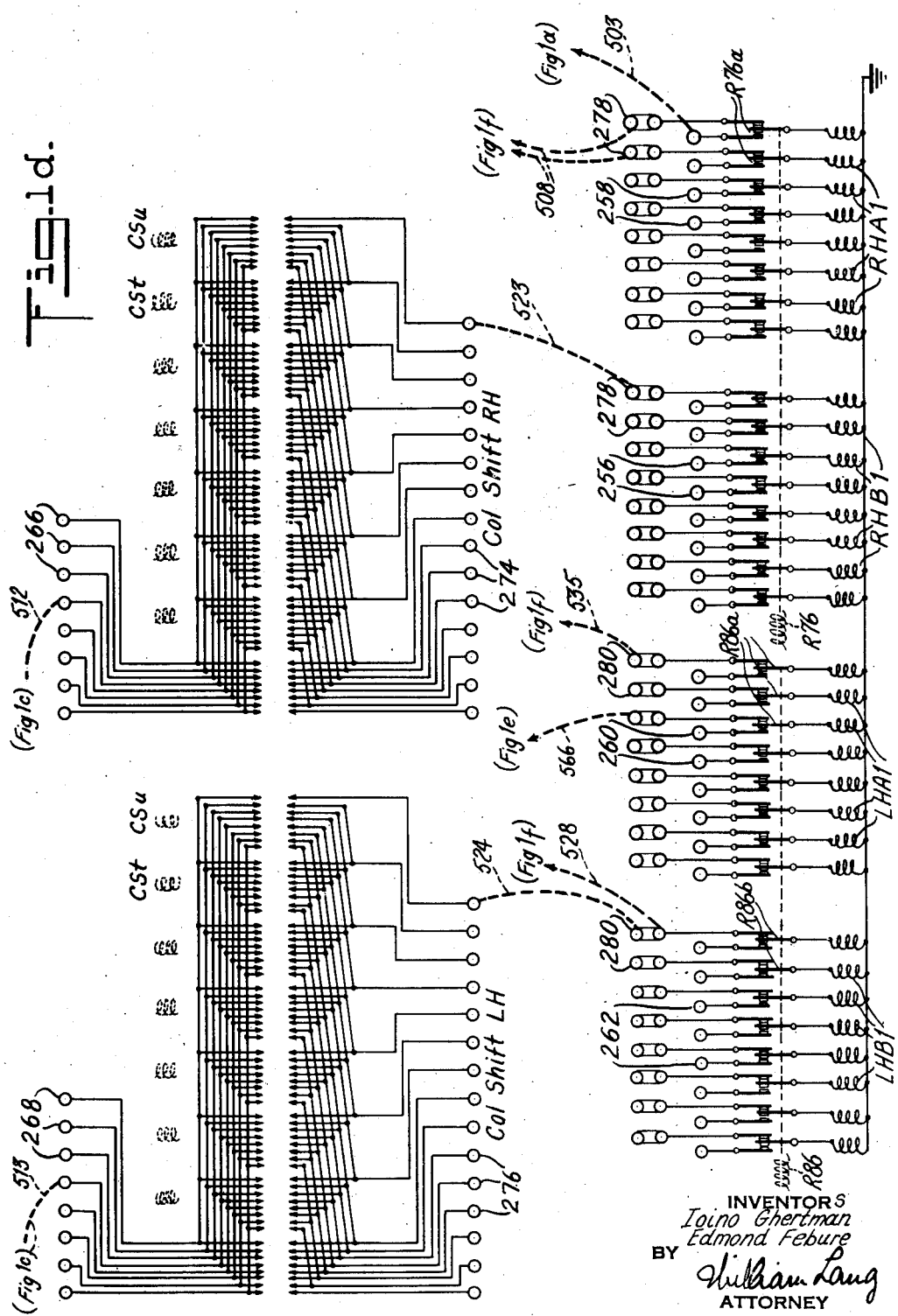

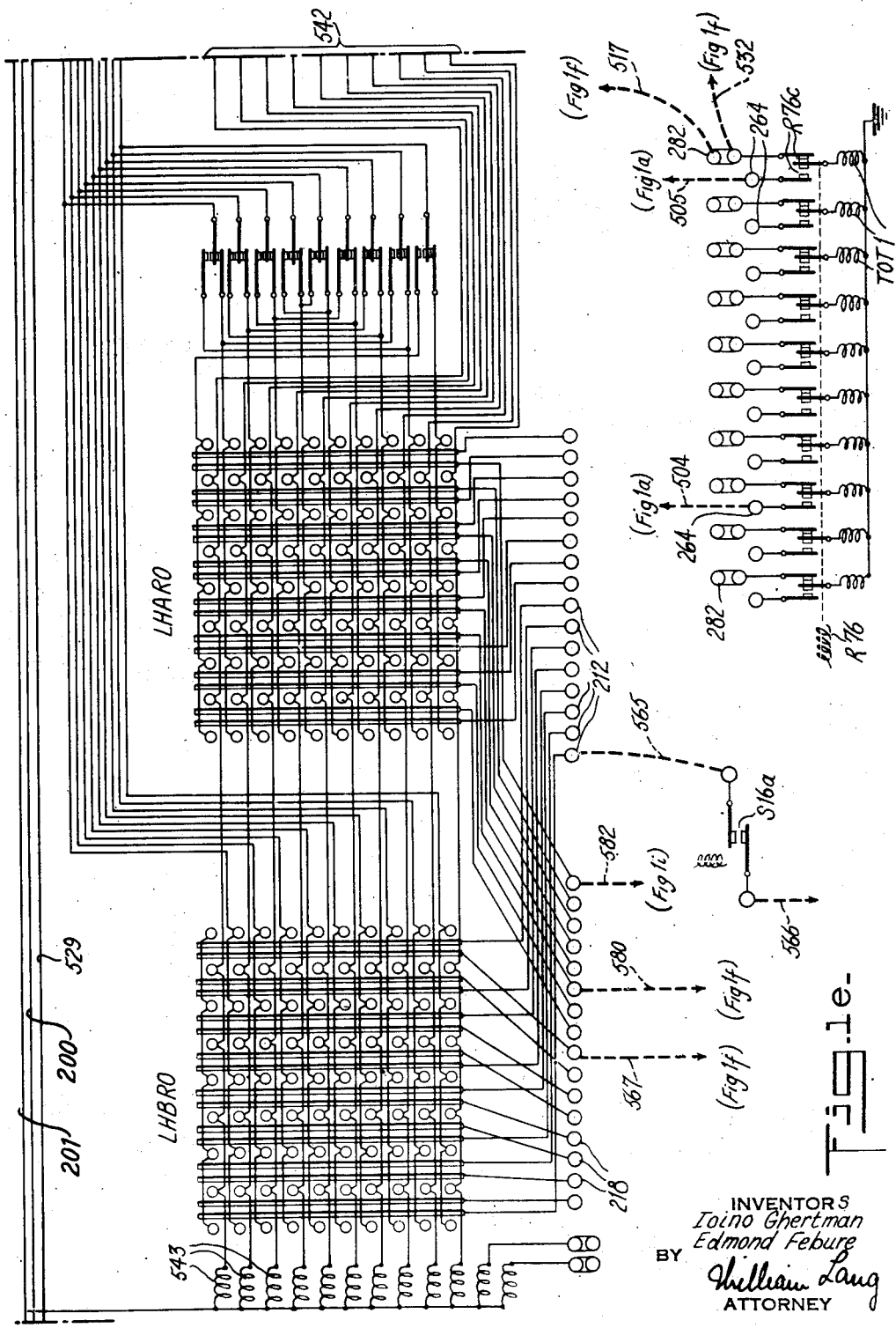

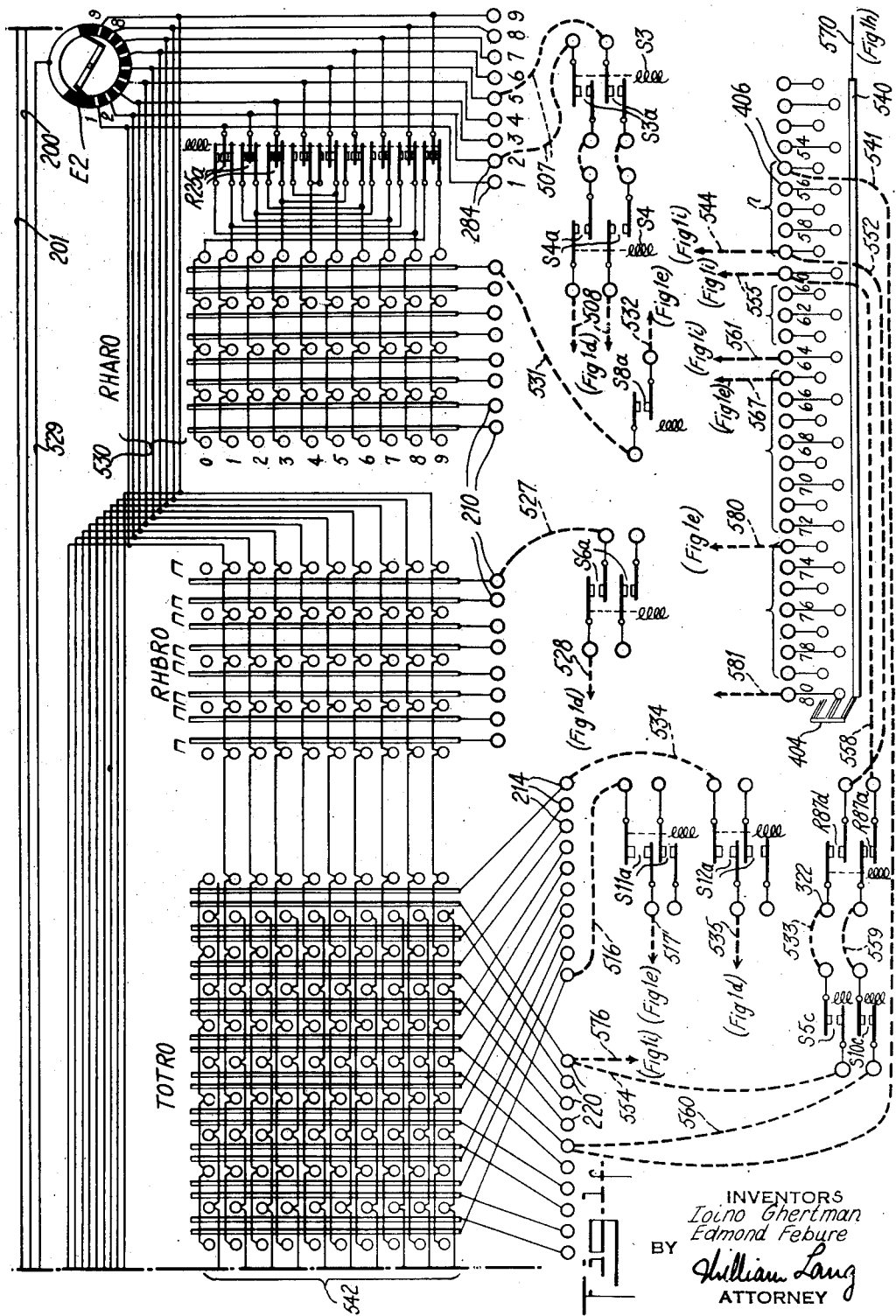

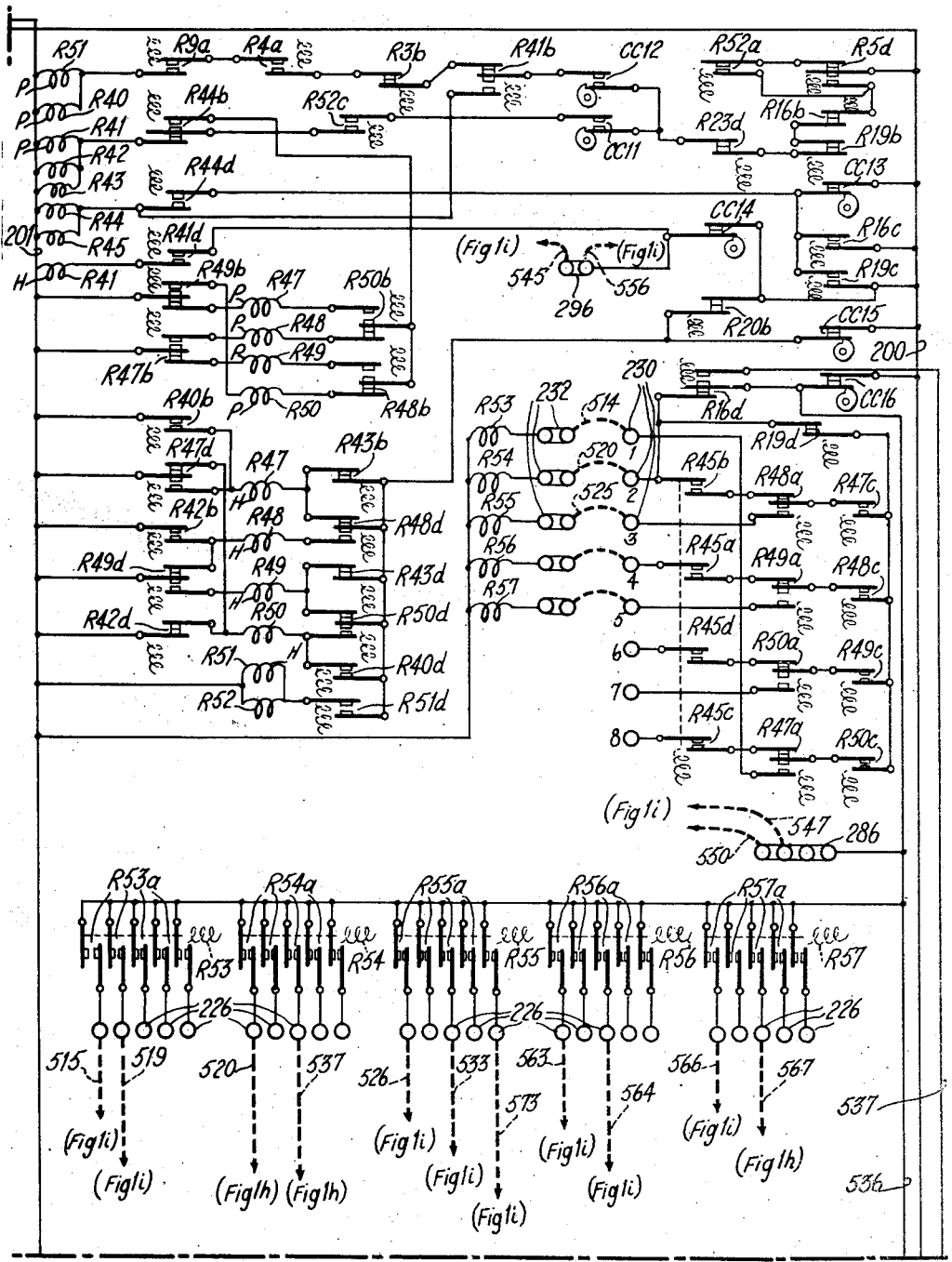

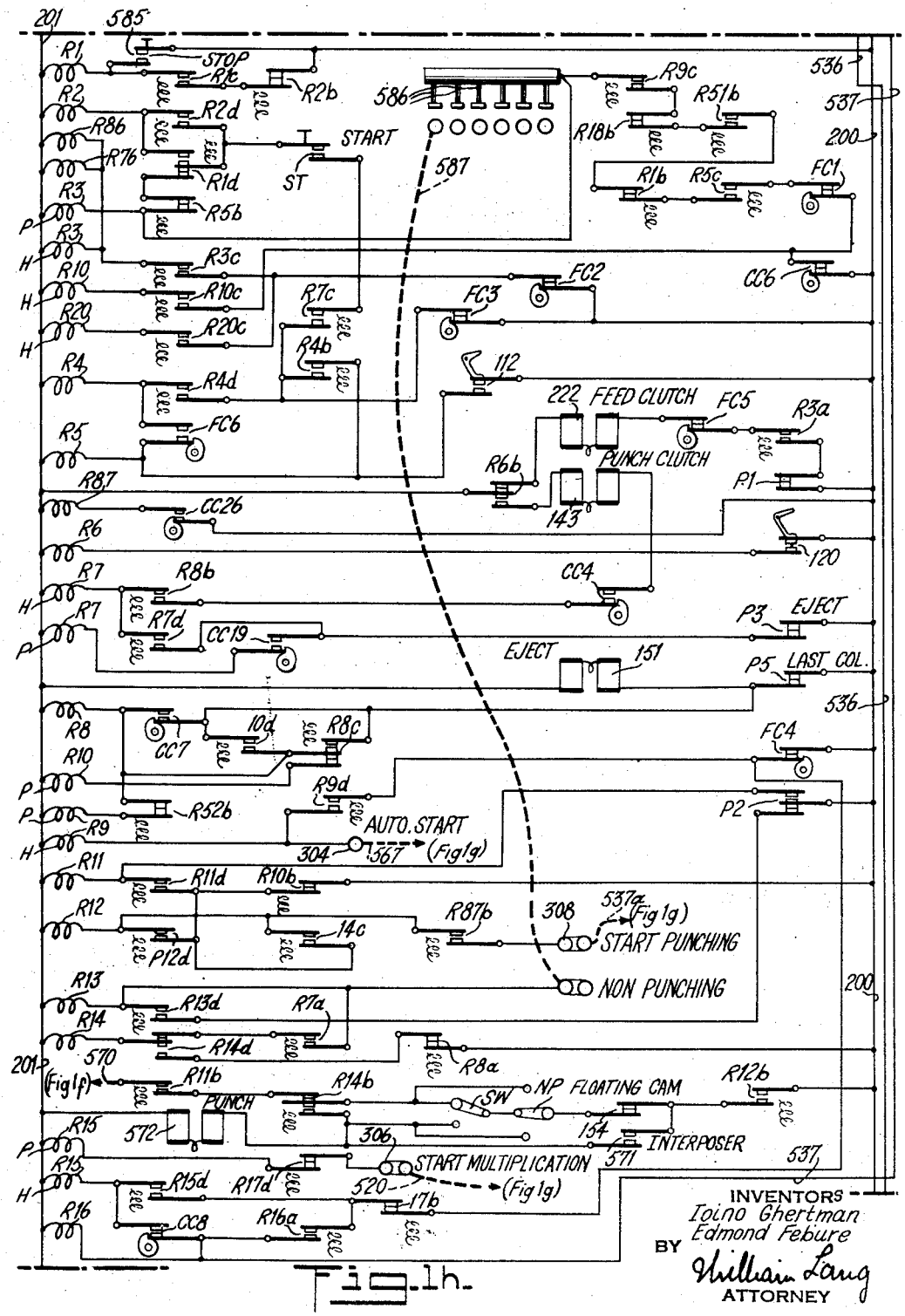

Aug. 5, 1952     I. GHERTMAN ET AL     2,605,964
RECORD CONTROLLED MULTIPLYING MACHINE
Filed June 19, 1948     16 Sheets-Sheet 9

INVENTORS
Ioino Ghertman
Edmond Febure
BY William Lang
ATTORNEY

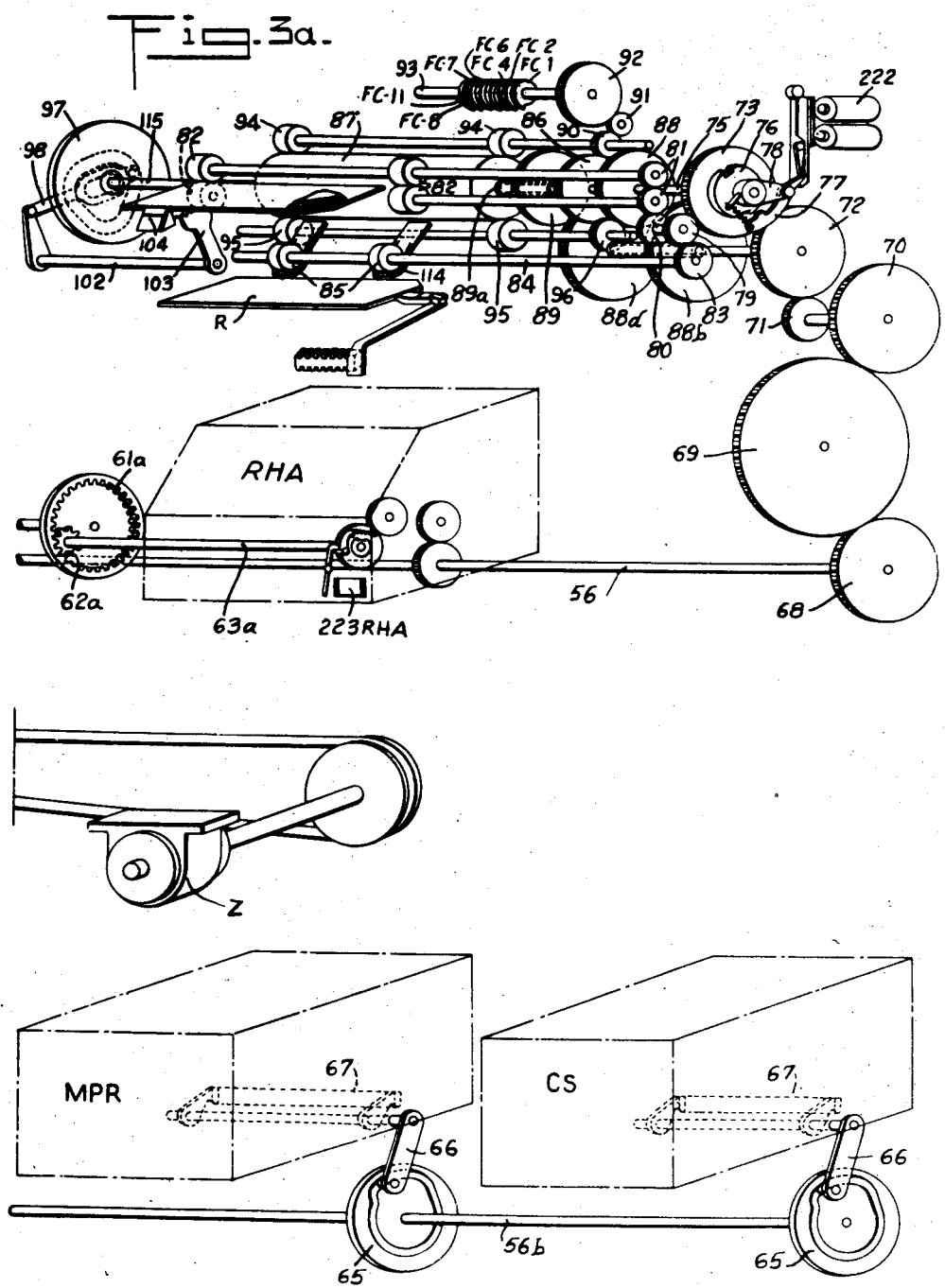

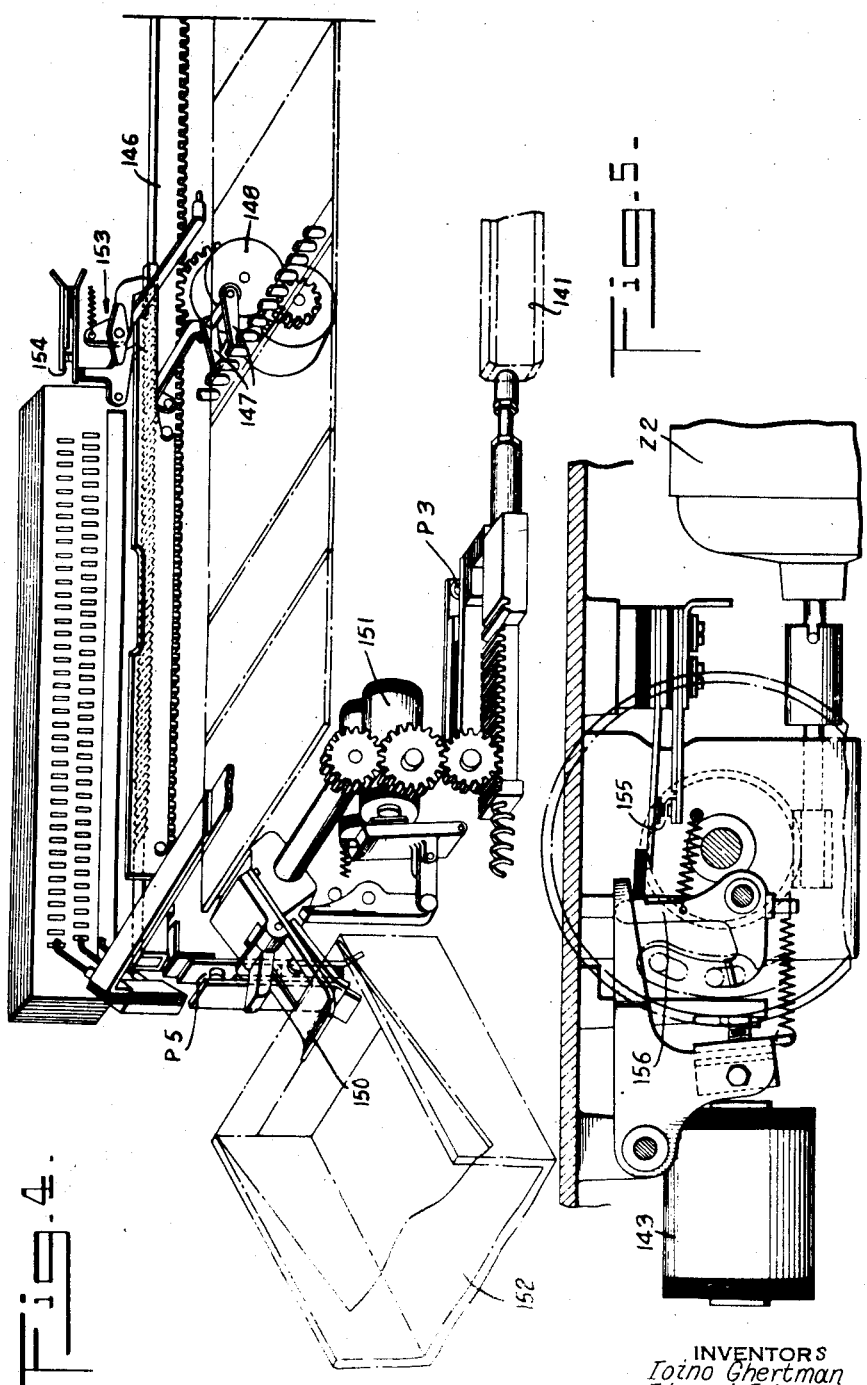

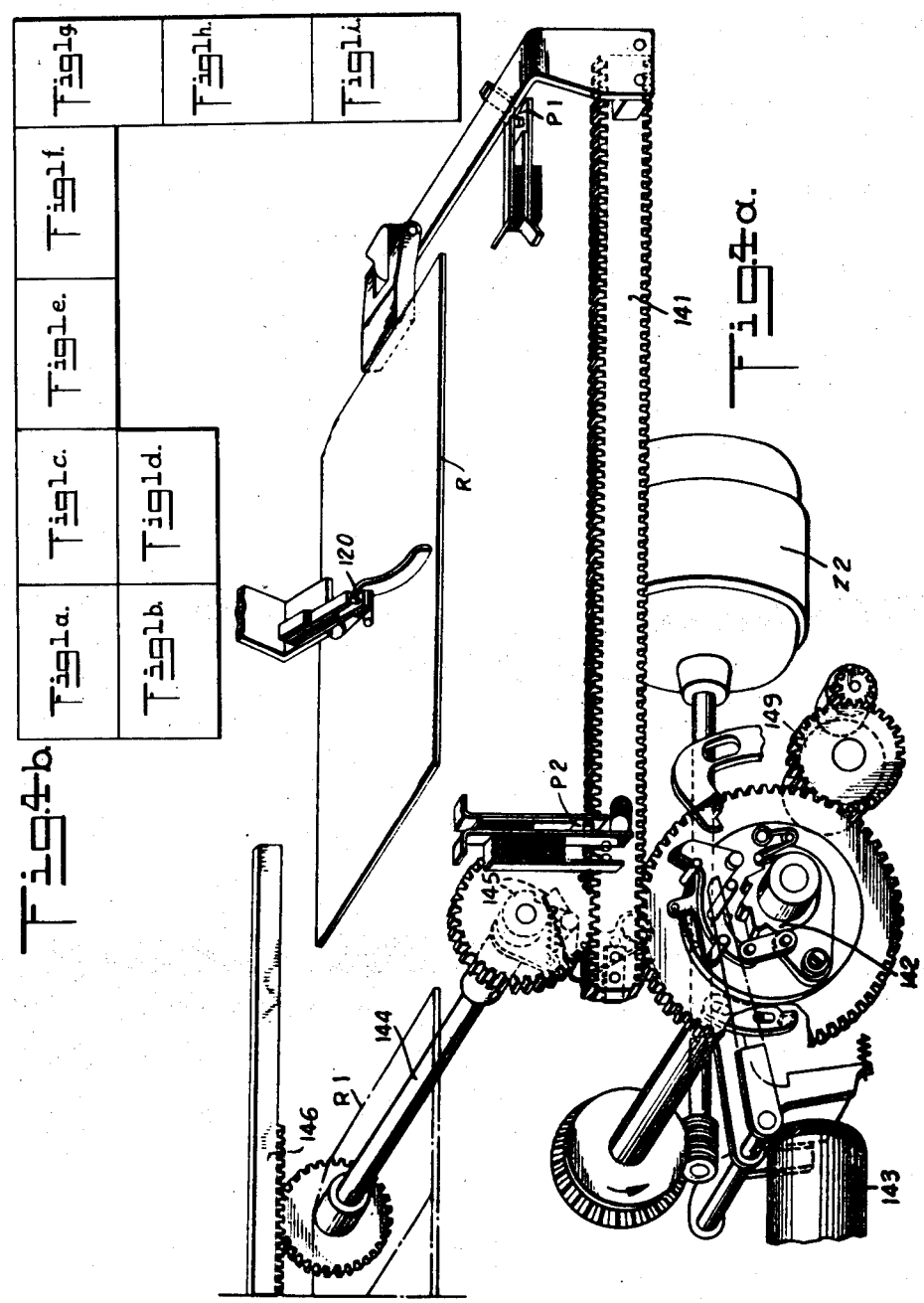

Aug. 5, 1952     I. GHERTMAN ET AL     2,605,964
RECORD CONTROLLED MULTIPLYING MACHINE
Filed June 19, 1948     16 Sheets-Sheet 14
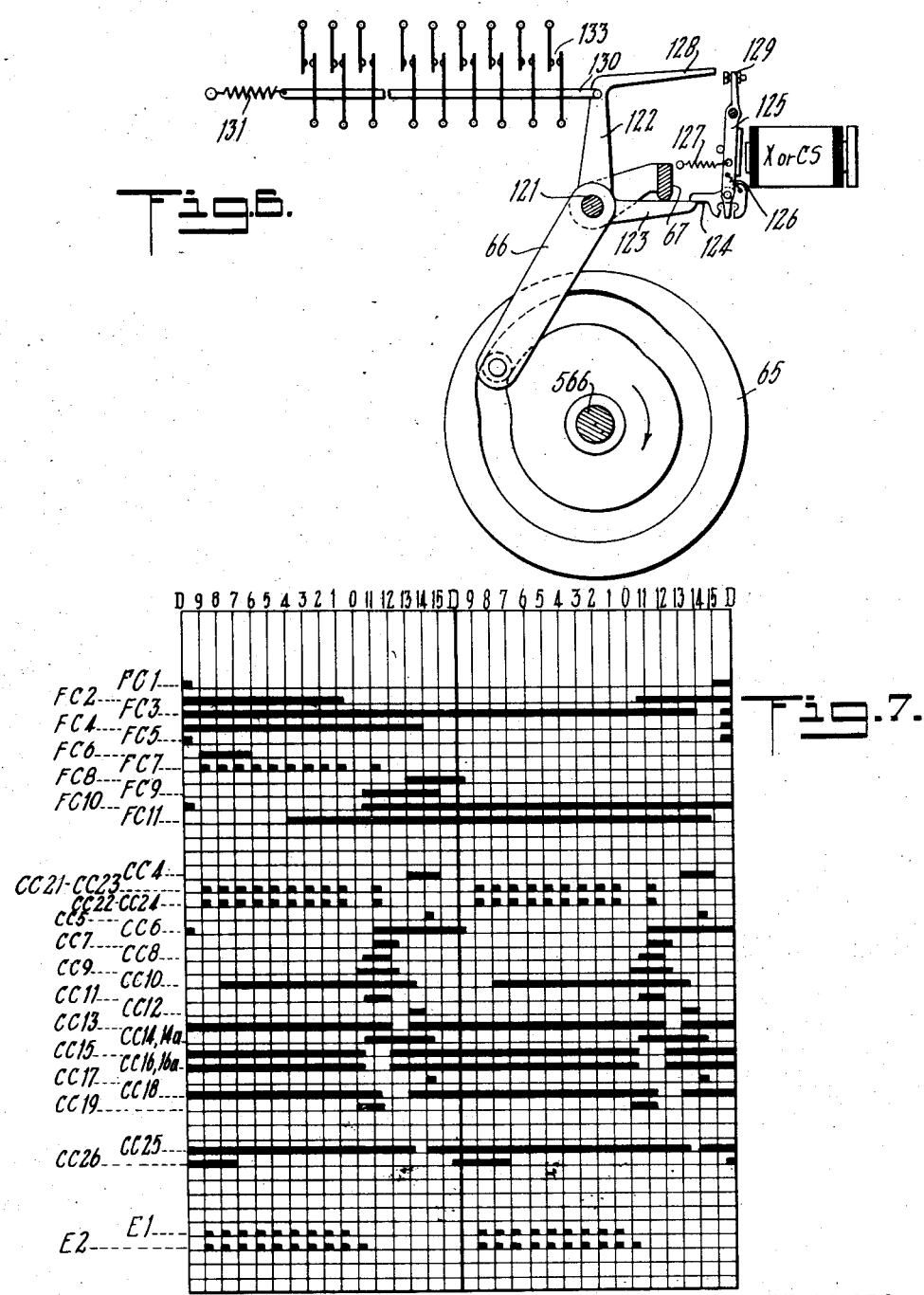
INVENTORS
Ioino Ghertman
Edmond Febvre
BY
William Lang
ATTORNEY

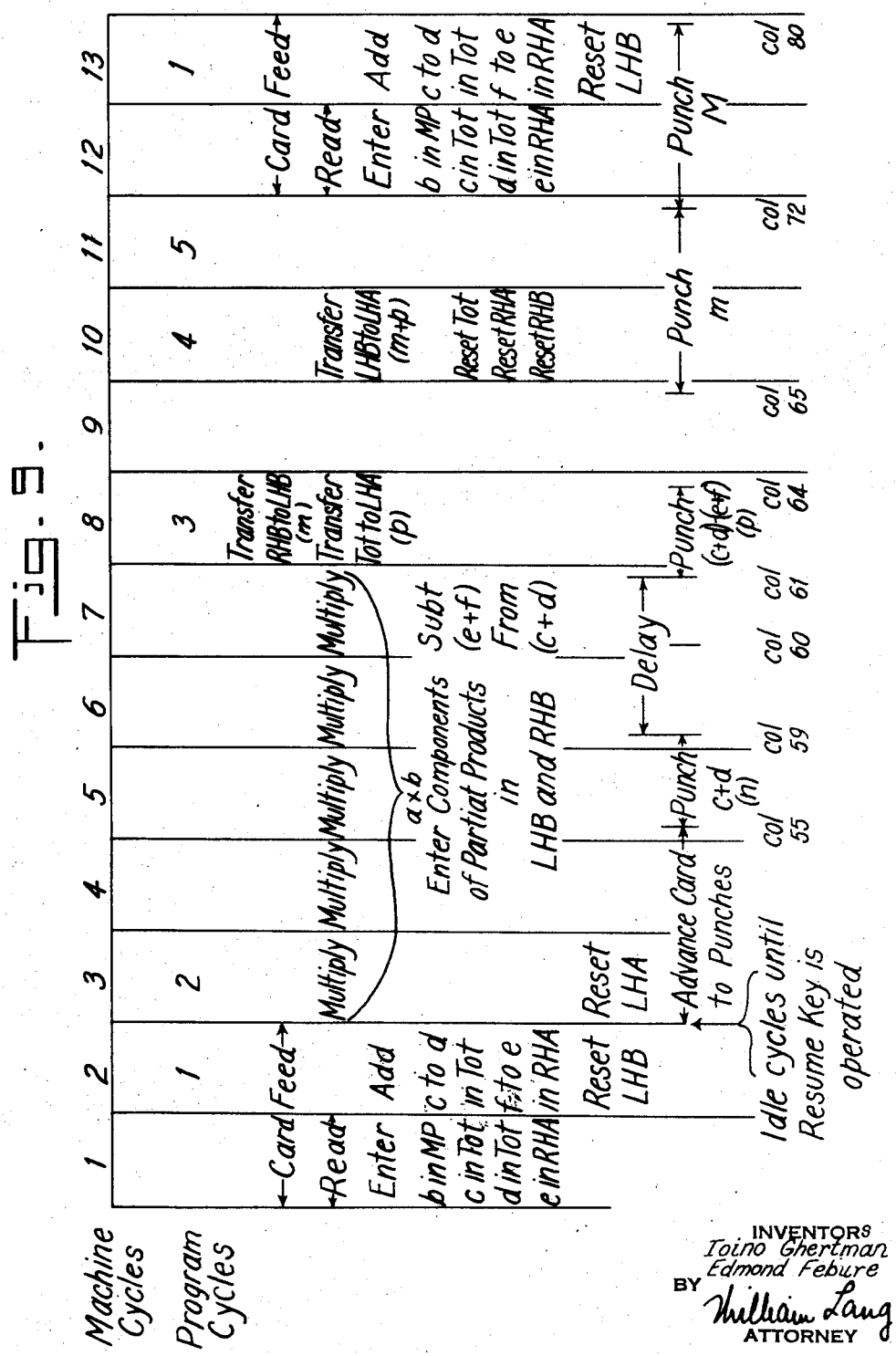

Patented Aug. 5, 1952

2,605,964

UNITED STATES PATENT OFFICE 2,605,964

RECORD CONTROLLED MULTIPLYING MACHINE

Ioino Ghertman and Edmond Febvre, Saint-Mande, France, assignors to International Business Machines Corporation, New York, N. Y., a corporation of New York Application June 19, 1948, Serial No. 33,954
In France June 30, 1947

3 Claims. (Cl. 235—61.6)

This invention relates to calculating machines of the record controlled type and more particularly to machines in which data are derived from a record card, computations performed in accordance with a predetermined sequence of calculations, and the results recorded back on the record card.

The principal object of the invention is to provide a calculating punch in which calculating and result recording operations are carried out more expeditiously than heretofore in machines of the same type.

Calculating machines of the type to which the invention is applied are provided with card feeding and sensing mechanism through which perforated record cards are fed singly and thereafter directed to a punching mechanism in which result data are punched into the card column by column or digit by digit. The machine is a so-called cyclic machine in that it operates on a cyclic basis with feeding and sensing occurring in early cycles, followed by a succession of cycles during which arithmetic computations, such as addition, subtraction and multiplication, are performed. The multiplication is carried out in accordance with the so-called partial products system in which a multiplicand is multiplied by the successive digits of a multiplier to obtain left and right hand components of partial products and enter them separately into so-called left and right hand component accumulators. Such operations require a cycle of operation for each significant multiplier digit involved and, after all the components have been obtained, the sum of the right hand components is added to the sum of the left hand components to obtain the complete product.

An object of the invention is to improve the control devices of the machine to the end that computations other than multiplying may be performed and the results thereof recorded during the performance of multiplying operations.

Another object of the invention is to provide improved controls responsive to the advent of selected card columns in punching position for controlling subsequent computing and recording operations.

Another object of the invention resides in the provision of cycle programming mechanism which is capable of being stepped once for each machine cycle and is preset to call into operation desired functions for each step thereof. Controls are provided to suspend stepping during multiplying cycles and to delay stepping under control of the recording mechanism, so that the functions called, for one step, are coordinated and completed before the functions called, for the next step, are initiated.

Another object of the invention resides in the provision of novel setup devices utilizing sets of relay contacts for setting up a plurality of multiplicand factors which are selectable under record control for multiplication by a multiplier factor derived from a record card.

Still another object is to provide improved controls for increasing the efficiency of the machine by coordinating the operations so that, while result data are being punched into one card, a following card is fed and sensed and data derived therefrom are entered into the computing mechanism of the apparatus.

Another object is to provide an improved column shift and cycle control mechanism for a multiplying machine in which provision is made so that this device may serve to initiate functional operations at any selected step of a multiplying operation.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, 1c, 1d, 1e, 1f, 1g, 1h and 1i taken together and arranged in the order indicated in Fig. 4b constitute a wiring diagram of the electric circuits of the machine.

Fig. 2 is a vertical sectional view taken through the card handling and reading section of the machine.

Figs. 3 and 3a taken together show a somewhat diagrammatic view of the various units of the machine and the driving mechanism therefor.

Figs. 4 and 4a taken together show a somewhat diagrammatic view of the punching section of the machine.

Figs. 4b is a diagram showing the order in which the figures of the circuit diagram are to be arranged.

Fig. 5 is a sectional view of certain parts in the punching section of the machine.

Fig. 6 is a view showing one of the electromagnetically controlled mechanically positioned multicontact relays which are used in the machine for multiplier selection and column shift purposes.

Fig. 7 is a timing chart of the various cam controlled contact devices.

Fig. 9 is a sequence chart showing the order in which the separate operations involved in a problem occur during a succession of cycles of operation of the machine.

Figure 1I:
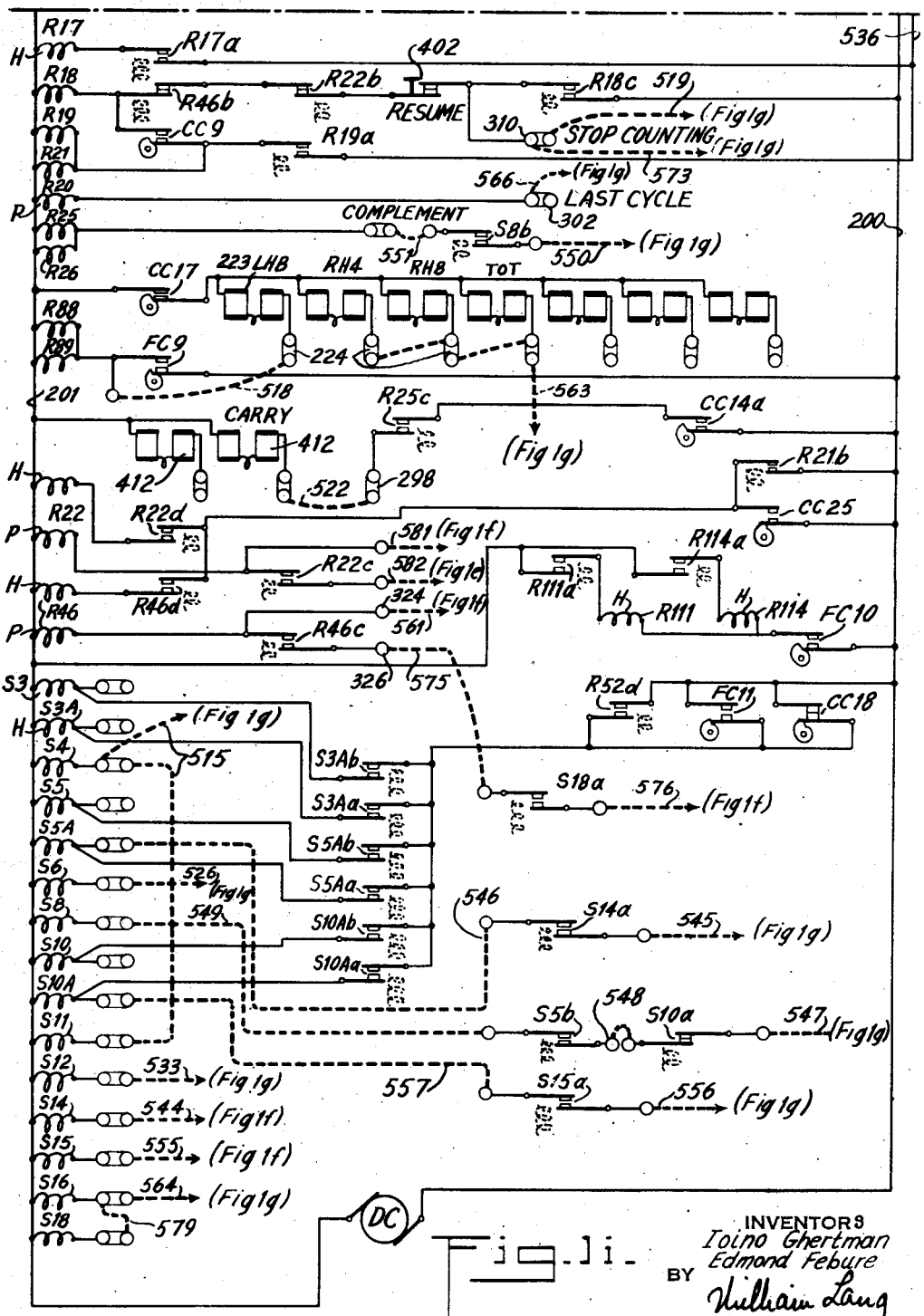

In mechanical structure, the machine is similar to the well known commercial multiplying punch shown in United States Patents 1,944,665, 2,088,408, 2,126,666 and 2,120,228.

A general description will first be given of the mechanical units and their location in the machine. The machine embodies a card feed and card handling section (see Figs. 2 and 3a) and there is also the usual successively actuated punch which receives each card as the card emerges from the card handling section. The punch is shown in Figs. 4 and 4a and a portion of the punching mechanism, viz. a portion of the receiving tray, is shown in Fig. 2.

The accumulators, of which five are shown, are as follows. There is provided the usual RH and LH accumulators designated RHA, RHB, LHA and LHB and a total accumulator designated TOT. There are two accumulators which are used as multiplier and multiplicand entry receiving devices which are designated MP and MC on Fig. 3. The machine also includes a multiplying relay unit MPR and column shift and control unit generally designated CS (Fig. 3a).

The usual emitters, cam contact devices and impulse distributor, etc. are likewise provided.

The main upper accumulator drive shaft 56 (Figs. 3 and 3a) is driven in the customary manner from the driving motor Z which also drives the A. C., D. C. generator 52. The usual Geneva reset drive is provided for the upper reset shaft 63 for the RHB, LHA, LHB and TOT accumulators. Such drive comprises parts 57, 58, 59, 60, 61, and 62.

The reset shaft 63a for the RHA accumulator is driven from the cross element 60 of the Geneva, through an internal gear 61a and pinion 62a. The lower main drive shaft 56b is also driven from the vertical connecting drive shaft 54, and reset drive for the lower reset shaft 63b is provided by parts 57b, 58b, 59b, 60b, 61b, and 62b.

CARD FEED AND CARD HANDING UNIT DRIVE

Referring to Figs. 2 and 3a, the customary card feed drive is provided which may be briefly described as follows. Shaft 56 through gearing 68, 69, 70, 71 and 72 drives a gear 73, revolubly mounted on shaft 75. Fixed to gear 73 is the element 76 of the one revolution clutch, the complemental part of which comprises a pawl 77 carried by an arm 78 fixed to shaft 75. Gear 73 through a gear 79 fixed to gear 80 drives a train of gears 81, which in turn drive the card feed rolls 82. Also in train with gear 79 is a gear 83 for driving drag roll shaft 84 carrying drag rolls 85. The usual card transfer and contact cylinder 87 is provided driven in the following manner. Fixed on shaft 75 is a gear 88 which, through gearing 88b, 88d, drives a gear 89 which is fixed to the sleeve 89a revolubly mounted on shaft 75 but fixed to the card transfer and contact roll 87.

The intermittently actuated FC group of cam contact devices are driven in the following manner. A driving train is provided from gear 86, which gear is fixed to shaft 75 and which train includes gearing 90, 91 and 92, the latter gear being fixed to the cam contact shaft 93. Fixed to the shaft of gear 90 are spring pressed card feed rolls 94. Other spring pressed card feed rolls 95 are driven by the gear 96. The card picker is driven in the customary manner by a box cam 97 fixed on shaft 75 cooperating with the follower 98 which rocks a rock shaft 102 carrying a gear sector 103 which is in engagement with the picker block 104.

Upon engagement of the one revolution card feed clutch, the picker is called into action to withdraw a single card from the magazine 105 (Fig. 2) and advance the card into the bite of rolls 82, which rolls in turn forward the card to the card transfer and contact roll 87. A curved card guide is provided around the transfer and contact cylinder and the advancing card is carried around by the forward rotation of the cylinder and by the rotation of rolls 94 to traverse the card past the main sensing brushes designated 109 in Fig. 2. Also in cooperation with the card is a pivoted card lever 111 operating card lever contacts 112.

After sensing, the card is advanced by the rolls 95 and cylinder 87 between guiding members 114 and 115, and while between these members it is advanced by drag rolls 85. The drag rolls 85 deliver the card under the guiding member 117 and ultimately the card is flipped down into the tray of the punching section of the machine. The location of the tray is indicated at 118 in Fig. 2 and the position of a card in this tray is indicated at R in Fig. 4a.

A card lever 119 (Fig. 2) is provided adjacent the tray for closing card lever contacts 120 when a card is in the tray.

MULTICONTACT RELAYS

The machine includes a number of electromagnetically controlled and tripped multicontact relays. These are used in the MPR and CS sections of the machine. The mechanical drive for these relays is provided for in the following manner.

The lower drive shaft 56b drives operating cams 65 (see Figs. 3a and 6). Cooperating with each cam 65 is a follower arm 66 which is adapted to rock a bail 67. Loosely mounted on shaft 121 are a number of U-shaped members 122 each provided with an arm portion 123 extending under the bail 67 and cooperating with a latch member 124 which is pivotally mounted on the armature member 125 and spring urged in a counterclockwise direction by a spring 126. The armature is normally rocked clockwise by a spring 127. Each member 122 has an armature knock-off arm 128 adapted to cooperate with a knock-off extension 129 of the armature. Also fixed to each member 122 is an insulated contact operating part 130 which is normally drawn to the left by a spring 131. The contacts 133 are provided, one side of each of which is fixed to the member 130. Upon the full movement of 130 to the left, the contacts 133 will close.

In the operation of this multicontact relay, the bail 67 is first displaced to the position shown and arm 123 is slightly depressed to relieve the strain from the latch point where 123 cooperates with 124. A relay magnet X or CS may then be energized, swinging the armature 125 to the right causing the latch 124 to clear 123 and snap down under spring action by spring 126 to a position at the end of member 123. Thereafter, upon further motion of the cam 65 in the direction indicated by the arrow, the bail 67 is elevated allowing a counterclockwise motion of member 122 and permitting the contacts to close under spring action. Subsequently, further movement of the cam 65 causes the bail 67 to be again depressed to reopen the contacts and to thrust 128 to the right to a supplemental extent to knock off any previously attracted armature. At this time there is a relatching of the latch 124 with member 123. If a given armature is not attracted by the energization of the relay coil, latch 124 will not be tripped and such latch will prevent the counterclockwise motion of members 122 and the closing of the contacts upon the elevation of bail 67.

PUNCHING MECHANISM

The punching mechanism is of the usual successively acting repetition punching type generally used in machines of this class. It is generally of the form shown in Lee et al. United States Patent 1,772,186 and in British Patent 362,529, corresponding to the United States patent of Lee et al. 1,976,618.

Briefly, the cards are read one by one in the card handling and sensing section of the machine and fed into the punch, and then traversed through the punch to the discharge magazine of the punch. After the receipt of the card in the receiving tray 118 in the punch at the R position and with the punch driving motor Z2 (Fig. 4a) in operation, a rack 141 is displaced to the left to push the card from the R position to the R1 position. Movement of the rack 141 to the left is effected by the one revolution punch clutch generally designated 142, which clutch is engaged by the energization of punch clutch magnet 143. The traverse of 141 to the left causes shaft 144 to rotate clockwise by means of the ratchet driving device generally designated 145. The clockwise rotational movement of 144 displaces rack 146 to the right to a position in which pusher fingers 147 (Fig. 4) can engage back of the trailing edge of the card at the R1 position. Thereafter, rack 146 moves to the left under spring power from a spring in barrel 148 and another spring drive at 149 (Fig. 4a) restores a rack 141 to its right hand position.

After the card has been passed through the punch, it ultimately reaches a position in which the eject mechanism 150 receives the card. Following this there is a trip of the eject mechanism by energization of eject magnet 151 and the eject mechanism swings to the position shown in Fig. 4 to deliver the card into a discharge magazine or box as indicated by the dotted line position of the card in Fig. 4. The box is designated 152. The movement of rack 146 to the left is under the influence of the usual escapement 153, and each time the card escapes a column the escapement contacts 154 are opened.

The punching section of the machine is provided with contacts which may be briefly described. Contacts P1 (Fig. 4a) are contacts which are closed when rack 141 is in extreme right hand position and in proper position to receive a new card from the card handling and sensing section of the machine. Contacts P2 are contacts which are normally in the position shown and which shift when rack 141 is in its extreme left hand position. Contacts P3 (Fig. 4) are eject contacts which open when the eject assemblage 150 is moved to card receiving position. With the eject mechanism in the position as shown, such contacts are closed. Contacts P5 are contacts which are normally open contacts and which close upon the movement of the rack 146 and of the card to beyond the last column position.

Contacts 155 (Fig. 5) are also provided, which are arranged to be closed upon energization of the punch clutch magnet 143. Such contacts are latched closed by a latch 156 and the latch is released and the contacts are allowed to open by a knockoff associated with the one revolution clutch assembly 142.

EMITTERS AND CAM CONTACTS

The main drive shaft 56 (see Fig. 3) is adapted to drive the cams of certain CC cam contact devices. Also driven from the shaft 56 are two emitters E1 and E2 which are of conventional construction.

Problem

A representative problem will now be generally explained, after which the circuits involved in handling the problem will be set forth in particular detail.

Figure 8:
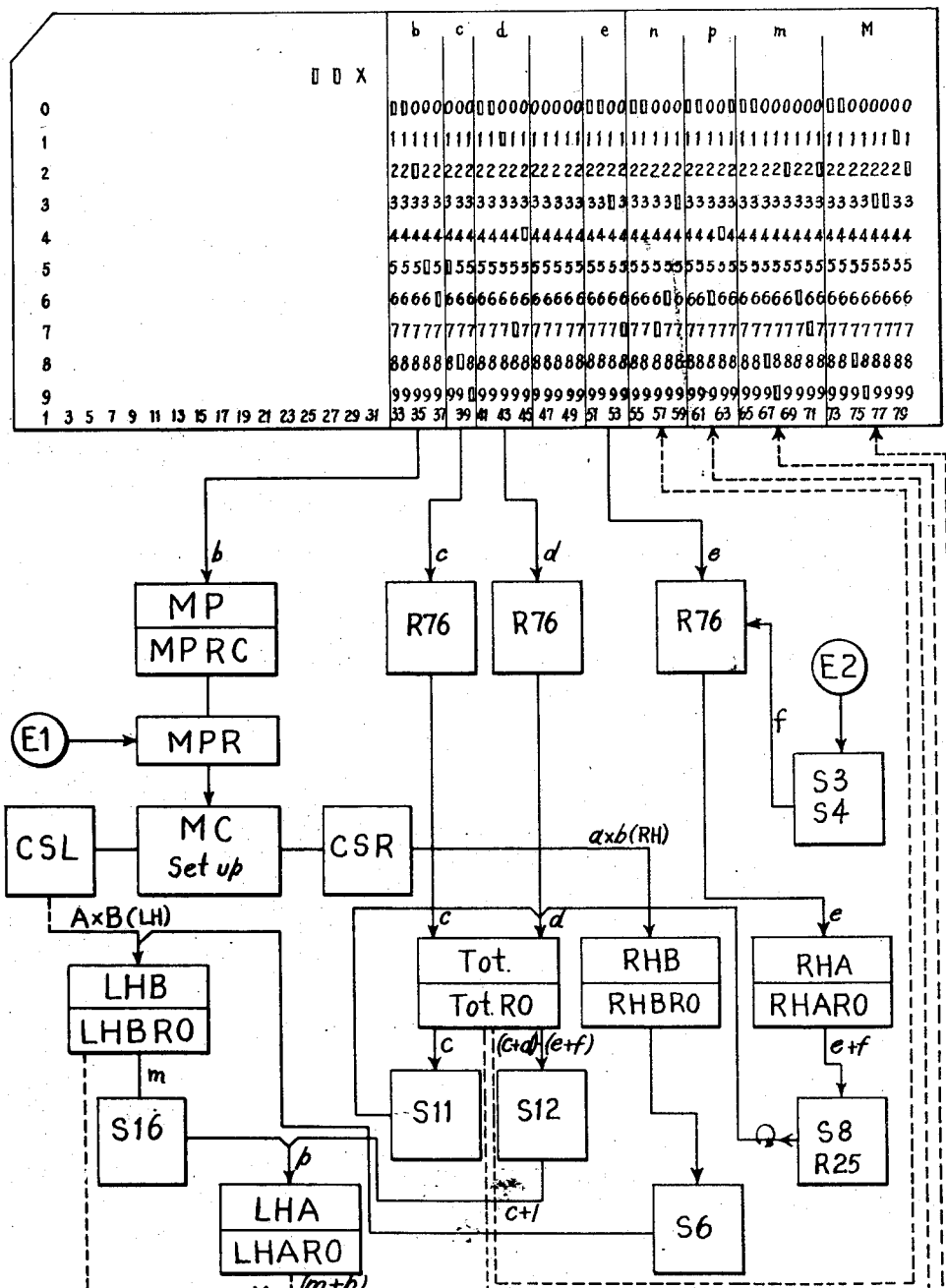
Fig. 8 is a diagrammatic flow chart showing the paths through which amounts from a record card are routed for a given problem.

Referring to Fig. 8, record card R has values punched therein which are represented as $b$, $c$, $d$ and $e$. These amounts will be sensed and the machine will operate to multiply the $b$ value by a selected one of several amounts preset in the machine, which may be called the $a$ amount. The selection will be effected by a perforation in the X position of column 28 of the card for one value of $a$ and by an X perforation in column 30 for another value. The values $c$ and $d$ will be added together to obtain a sum $n$ which will be punched back into the card in the field indicated. A value $p$ is obtained by subtracting the value $e$ from the sum $n$, to which $e$ value a further value $f$ may first be added from a settable source under control of an X perforation in column 26. The $p$ value is punched in the field so designated. The product of $a$ times $b$ resulting in the value $m$ is punched as shown, and finally the sum of $m$ plus $p$ is obtained, which is designated M and punched in the last field of the card. These operations may be summed up as follows:

$$a \times b = m$$
$$c + d = n$$
$$n - (e + f) = p$$
$$m + p = M$$

In Fig. 9 the general sequence of operations is represented through a succession of what are termed "machine cycles," during the first of which the card is read and, as noted, multiplication occurs during a number of successive cycles beginning with cycle 2. Prior to the multiplication, cross adding operations take place to obtain the value $n$ $(c+d)$, and this value is punched while multiplication of values $a$ and $b$ takes place. Also, $f$ is added to $e$ and, while multiplying proceeds, the value $e$ plus $f$ is subtracted from $n$ and the result $p$ is punched. There is thus an overlap in cross adding and punching operations and multiplication, after which the results $m$ and M are obtained and punched back into the card. While the punching of M takes place, the second card is read and cross adding operations commence with values derived from such second card, so that there is at this point a further overlapping of operations, all of which are instrumental in increasing the overall speed of operation of the apparatus.

Before initiating the operations, a number of plug connections are made to set up the program or sequence in which the various operations are to be performed. These connections are indicated on the circuit diagram and will be pointed out in the order in which they are effective as the description of the problem proceeds.

CIRCUIT DIAGRAM

The initial starting position of the machine is with the parts in the relative positions as shown in Fig. 4, wherein the card ejecting gripper 150 is in its operated position and the so-called ejection contacts P3 are closed. In Fig. 1h the closure of these contacts completes a circuit from the right side of line 200, through ejection contacts P3, cam contacts CC19 and pickup winding of the relay R7 which will cause closure of contacts R7d to provide a holding circuit which will maintain the relay energized until contacts P3 open. The relay is connected to the left hand side of line 201, which extends down (Fig. 1i) and terminates at generator designated DC which serves to provide current to lines 200 and 201.

Record cards perforated with the values $b$, $c$, $d$ and $e$ and X perforations in column 26 and in either of the columns 28 or 30 are placed in the feed hopper of the machine and the start key ST is depressed (Fig. 1h). This will bring about energization of relay R3 through a circuit traceable from line 200, contacts FC3, contacts R7c, start key contacts ST, lower contacts R1b, contacts R5b, relay R3 to line 201, resulting in closure of contacts R3c to provide a holding circuit through the contacts FC2.

It may be pointed out that relay R3 as well as relay R7 is of the type wherein a double winding is provided either of which, when energized, will cause closure of related contacts. In this type of relay, one of the windings usually serves as a pickup winding and is designated with a P and the other as a holding winding designated with an H. Relay R3 closes a pair of contacts R3a to complete a circuit from line 200, contacts P1 (see Fig. 4a), contacts R3a, FC5, the card feed clutch magnet 222, relay contacts R6b to line 201. Energization of magnet 222 will, as usual, bring about feeding of a record card from the bottom of the hopper (see Fig. 2) and advance it to a position where its leading edge is just at the sensing brushes 109. During this cycle the FC cam contacts will operate to make one revolution corresponding to two machine cycles during the second of which the so-called X card lever contacts 112 are closed by the card and a circuit is completed therethrough (Fig. 1h) to energize relay R5.

In Fig. 7 it is seen that the contacts FC1 open shortly after the beginning of this card feed operation and reclose shortly before the completion thereof. Upon such closure, a circuit is completed from line 200, through contacts CC6, FC1, R5a now closed, R1b, R51b, R18b, R9c now closed, to relay R3 and line 201. Relay R3 becomes deenergized when contacts FC2 open. The relay R9 has previously been energized through the Last Column contacts P5 which energize relay R8 through contacts CC7, holding through contacts R8c, and a parallel circuit is completed through relay R9 through the normally closed contacts R52b. This results in closure of contacts R9d to provide a holding circuit for relay R9 extending through contacts FC4 and paralleling the holding circuit extending from line 201, upper pickup winding of relay R9, contacts R52b, R8c (shifted) and contact P5 to line 200. Relays R8 and R9 will accordingly remain energized until contacts P5 open, which will occur when the punch carriage rack 146 (Fig. 4) is shifted to the right.

The resulting reenergization of relay R3 (which was deenergized when contacts FC2 opened during the first feeding operation) will bring about a second energization of feed clutch magnet 222 and a second feeding cycle takes place, during which the first card will now be advanced to pass the brushes 109 (Fig. 2), and at the same time a second card will be fed from the hopper. The advance of the first card will be into the so-called tray of the punching machine into position designated R1 in Fig. 4a from which it will be advanced toward the left into punching position. In this feed cycle contacts FC6 (Fig. 1h) close to energize relay R4 through card lever contacts 112 and a holding circuit is set up through contacts R4d and FC3 which together with contacts 112 keep relay R4 energized as long as cards follow in succession.

READING CYCLE

During this cycle, which is designated as machine cycle I in Fig. 9, the amounts $b$, $c$, $d$ and $e$ are read from the card and entered into receiving devices as diagrammatically represented in Fig. 8. Briefly, the amount $b$ is entered into the multiplier device MP, the $c$ amount is entered into the left hand side of the total accummulator TOT, the amount $d$ is entered into the right hand portion of the accumulator and the amount $e$ is entered into the accumulator designated RHA. The several entering circuits are traceable as follows. In Fig. 1a, current is supplied from generator designated AC to plus line generally designated 202 from which it passes through impulse emitting contacts designated CC21 to CC24, thence to contacts R5c now closed, contacts FC7 to the common contact roll 87 (Fig. 1b), thence through perforations in the card to the sensing brushes 109 from which it branches as follows.

For the $b$ amount, the circuits extend from plug sockets 250, through a representative plug connection 501 to socket 252 and to the entering magnet designated MP1 of a multiplier receiving device and thence to ground. This circuit extends through the usual reversing contacts 502 which remain in the position shown throughout the operation.

For the amount $e$, the circuit extends from related plug sockets 250, through a representative plug connection designated 503 (Fig. 1d) to plug socket 258, thence through relay contacts R76a (now shifted) to accumulator magnet designated RHA1 and thence to ground. The relay R76 (Fig. 1h) is wired in parallel with relay R3, so that it is in energized condition at this time.

For the amount $c$, the circuit extends from related plug sockets 250, through a representative plug connection designated 504 (Fig. 1e) to plug socket 264, thence through relay contacts R76c (now shifted), to accumulator magnet designated TOT1 and thence to ground.

For the amount $d$, the circuit extends from related plug sockets 250, through a representative plug connection designated 505 (Fig. 1e) to plug socket 264, thence through relay contacts R76c (now shifted) to accumulator magnet designated TOT1 and thence to ground. The amount $d$ is thus entered into the right hand section of the total accumulator and the amount $c$ into the left hand section, while amount $e$ is entered into the RHA accumulator and the amount $b$ in the MP receiving device, as diagrammatically represented in Fig. 8.

SELECTION OF THE f AMOUNT

If the record card contains an X perforation in column 26, a circuit is completed upon the sensing of this perforation which is traceable in Fig. 1b from the related socket 250, through a connection 506 to a socket designated 318, thence through the pickup winding of a selector relay designated S3A, contacts R88a to ground. The relay R88 is shown in Fig. 1i where through cam contacts FC9 it is energized during the period that the X position of the card is sensed, so that the contacts R88a are closed at that point. In Fig. 1i, relay S3A closes its contacts S3Aa to provide a holding circuit through the second (H) winding of the relay from line 201, relay S3A, contacts S3Aa, contacts FC11 and CC18, in parallel, to line 200. This holding circuit is thereby maintained through the entering period of the folowing cycle. Contacts R52d close before the cam contacts open and will maintain the holding circuit throughout the operation.

Relay S3A closes a second pair of contacts S3Ab to energize selector relay S3 through a parallel circuit, and for the same period of time this relay is held energized. In Fig. 1f relay S3 closes contacts S3a which are connected through plug connections designated 507 to sockets 284 connected to emitter E2 in a manner to select a value; for example, the plug connections shown select the value 25 by being connected to the 2 and 5 sockets 284. The opposite side of the contacts S3a are connected through contacts S4a of a selector S4 (now closed) and plug connections 508 to plug sockets 278 (Fig. 1d), thence through contacts R76a (normal) to magnets RHA1. The plug connections are arranged so that the value 25 is entered into the same columnar positions as the previously entered value e, so that the sum of e plus f is obtained in accumulator RHA.

SELECTION OF THE MULTIPLICAND AMOUNT

Assuming an X perforation in column 28, a circuit is completed during the sensing period which is traceable from socket 250 related to column 28, through plug connections 509 (Fig. 1b) to socket 416, pickup winding of relay R111, contacts R88a to ground. The relay R88 is energized through cam contacts FC9 during the period in which the X positions are sensed. Relay R111 closes contacts R111a (Fig. 1i) to energize the second winding H of the relay through a circuit extending from line 200, through contacts FC10 to line 201. Further contacts R111b (Fig. 1c) are wired between a set of plug sockets 424 and a set designated 435, while the contacts R111c are wired between sockets 430 and 437. A set of plug sockets 428 is provided in the connections between the multiplying relays and the multiplicand readout device MCRO for right hand partial products. A similar set of sockets 434 is provided in the corresponding connections for the left hand partial products.

For the purposes of the present invention, plug connections 510 are made between sockets 424 and 428 in accordance with the value of a selected multiplicand or "a" value. Thus, in Fig. 1c connections are made to represent the value 3487. A duplicate set of connections 511 is made between the sockets 430 and 434 to represent the same value. Thus, when relay R111 is energized, it will connect the wires extending from the multiplying relays to plug sockets 435 and 437. These plug sockets are connected through plug connections 512, 513 (Fig. 1d), respectively, to the column shift sockets 266 and 268, respectively.

If the X perforation occurs in column 30 instead of column 28, relay R114 (Fig. 1b) will be energized and held in the same manner as explained for relay R111, it being noted that the hold circuit (Fig. 1i) will be established during the card reading period of operations and will be maintained by contacts CF10 throughout subsequent computing cycles and until the next card is fed. The tracing of the multiplying circuits through the contacts of relay R111 will be deferred until later in the description.

PROGRAM DEVICE

It is at the end of the card reading cycle that the Program Device is brought into operation. Near the end of this reading cycle, contacts CC12 (Fig. 1g) are momentarily closed and complete a circuit which is traceable from line 200, contacts R5d (shifted), contacts R16b, R19b, R23d, contacts CC12, R41b, R3b (now reclosed), R4a (closed), R9a (closed), pickup windings of relays R40 and R51 to line 201. Relay R51 closes a pair of contacts R51d to complete a circuit from line 200, contacts CC15 and contacts R20b in parallel therewith, contacts R51d, a second H winding of relay R51 and relay R52 in parallel therewith to line 201. The relay R51 will accordingly remain energized until contacts R20b and CC15 are both opened. Relay R20 will not be energized until near the completion of the sequence of operations, so that its contacts R20b remain closed to keep relays R51 and R52 energized for such period. In Fig. 1i contacts R52d close before the circuits to relays S4 and S3 are broken, and these relays will accordingly remain energized also.

Relay R40 closes a pair of contacts R40b (Fig. 1g) through which a circuit is traceable from line 200, contacts CC15 and R20b in parallel, contacts R43b and R48d in parallel, relay R47, contacts R40b to line 201. Concurrently, the circuit branches from contacts R20b, through contacts R40d (now closed), relay R50, contacts R42d, to line 201. Relay R47 shifts its contacts R47d to provide a holding circuit and relay R50 shifts its contacts R50d to likewise provide a holding circuit for itself. Accordingly, near the end of the reading cycle the momentary closure of contacts CC12 will result in energization of relays R40, R47, R50, R51 and R52. The consequent closing of contacts R50c and shifting of contacts R47a will direct an impulse to plug socket 230 designated 1 and representing program cycle 1. This impulse extends from line 200, through contacts CC16, through contacts R16d, R19d, R50c, lower contacts R47a to the 1 socket 230. From this socket a plug connection 514 is made to one of the sockets 232 to energize relay R53, for example. Briefly, the first program cycle is called into operation by energization of relays R47 and R50 and this may be termed the "first program condition" or "setting" of the program device.

FIRST PROGRAM CYCLE

The relay R53 closes a set of four contacts designated R53a, each of which has connection to a separate plug socket 226 and all are connected to line 200, through contacts CC16. For the problem under consideration (see Fig. 9) the amount c is to be added to the amount d in the first program cycle. An amount f is to be added to the amount e and the LHB accumulator is to be reset, which is, of course, an idle operation at this time. During this first program cycle and through plug connections 515 (Figs. 1g and 1i) relays S4 and S11 will be held energized in parallel through the accumulator entering portion of the cycle. Relay S11 will shift contacts designated S11a (Fig. 1f) which have been plug connected to plug sockets 214 of the total accumulator readout device in the columns of which the c amount has been entered. These plug connections are designated 516. The contacts are further connected through plug connections 517 to sockets 232 (Fig. 1e) associated with the denominational orders of the total accumulator into which the d amount had previously been entered, so that through these connections the c amount is transferred from the highest orders of the total accumulator to the lowest orders obtaining in the latter sum of c+d. At this same time, with contacts S4a now closed (Fig. 1f) the f amount is entered into the RHA accumulator to obtain the sum e+f as already explained through relay contacts S3a and S4a (Fig. 1f).

*Resetting the LHB accumulator*

This is an idle operation at this time and the circuit is traceable from line 200 (Fig. 1i), contacts FC9 and plug connection 518 to the socket 224 associated with the reset magnet 223LHB of accumulator LHB, thence through cam contacts CC17 to line 201. Energization of the magnet 223LHB will effect resetting of the accumulator in the well known manner.

At this time circuits are also completed to effect interruption of impulses to the cycle counter. This also is of no importance at the present time but applies to later operations wherein punching under control of a preceding card may be taking place while the operations just explained for the first card are taking place. In such event, it is desirable to delay cyclic program operations until the punching has been completed. The cycle stopping circuit involved is traceable from line 200, contacts CC16 (Fig. 1g), a pair of contacts R53a, plug connection 519 to plug socket 310 (Fig. 1i) designated Stop Counting, thence through contacts 402 of a cycle resuming key, contacts R22b, R46b and relay R18 to line 201. Relay R18 is held through closure of its contacts R18c and through contacts CC9 relays R19, R21 will be energized in parallel with relay R18. Relay R19 closes its contacts R19a to hold the relay through wire 536 (Figs. 1h, 1g) and contacts CC16 to line 200. The relay R19 opens its contacts R19b (Fig. 1g) to break the circuit to the stepping impulse contacts CC12 and CC11 and opens its contacts R19d to break the impulse circuit to the program sockets 230.

As a result, the machine will idle after the first program cycle and resumption is effected by opening the cycle resuming key contacts 402. Alternatively, if contacts 402 are opened before the cycle is completed, relays R18 and R19 will not be energized at all and program cycle 2 follows immediately as indicated in Fig. 9. Following the reclosure of contacts R19b (Fig. 1g), contacts CC11 close and a circuit is completed from line 200, contacts R5d (shifted), R16b, F19b, R20d, CC11, R52c (now closed), R44b, relays R41, R42 and R43 in parallel to line 201. Relay R41 is held through contacts CC14 and R41d connected to the second (H) winding of the relay. Relay R42 opens its contacts R42d which results in deenergization of relay R53. Later in the same cycle, when contacts CC12 close, relays R44 and R45 will be energized through the circuit extending from contacts CC12, R41b (now shifted), to the relays R44 and R45 and to line 201. These relays will then hold through contacts R44d and CC13. The consequent closure of contacts R45b will direct the impulse to the 2 socket 230 traceable from contacts CC16, R16d, R19d, R47c (closed), R48a, R45b (closed) to the 2 socket 230, from which a plug connection 529 is made to a socket 232 to energize relay R54 which in turn closes a set of contacts R54a, terminating in another set of sockets 226 from which connections are made in accordance with functions to be performed during the second program cycle.

SECOND PROGRAM CYCLE

During this cycle, multiplying operations will be commenced to obtain the product of $a \times b$. Concurrently, the record card will be advanced to the punching position to receive punching of the sum $c+d$ which is $n$. Also, as indicated in Fig. 9 there is an idle resetting of accumulator LHA.

*Multiplication*

Considering first the multiplying operations, a circuit is first completed from contacts CC16 to one of the contacts R54a and a plug connection 520 extending to socket 306 (Fig. 1h) labeled Start Multiplication, and thence through contact R17d to relay R15 which closes its contacts R15d to provide a holding circuit through contacts R17b and cam contacts FC4. Relay R15 will remain energized until relay R17 is energized at the completion of multiplying operations.

Referring to Fig. 1a, relay R15 closes a pair of contacts R15a and R15c which control circuits to the multiplier readout device designated MPRO for selection of multiplying relays in Fig. 1c designated X1, X2 . . . X9 in the well known manner and to also selectively energize the well known column shift relays designated CSu, CSt, etc. which direct the partial products into the right and left hand component accumulators. The column shift and cycle control circuit network shown in Fig. 1a provides for effecting multiplying operations for only the significant digits of the multiplier and a representative circuit is traceable as follows. Assuming that there is a significant digit entry in the units order of the MP accumulator, this circuit will extend from the generator AC to wire 202, contacts CC5, R15a, upper contacts Yu2, relay CSu, the readout brush and segment to the corresponding digit wire of the group designated 521 (Fig. 1c) where it extends to the multiplying relay corresponding to the digit represented. This multiplying relay will close two sets of contacts which are wired to the emitter E1 in accordance with the multiplication table, so that impulses are transmitted to a group of wires 522LH in accordance with the LH components resulting from multiplication by the selected digit and similar impulses are directed to the group of wires 522RH in accordance with the right hand components.

These circuits extend directly to the readout device of the multiplicand accumulator designated MCRO in Fig. 1d. For the purposes of the present invention, sets of plug sockets 428, 434 are introduced in these sets of wires and from these plug connections 510 and 511 are made to the sockets 424 in accordance with a selected multiplicand value as explained. With relay R111 energized for the particular problem, the circuit extends from lines 522LH and 522RH through contacts R111b and R111c to the plug sockets 435 and 437, respectively, and assuming a multiplier digit of 9 for the plug connections shown where the multiplicand selected is 3487, the impulses directed to sockets 435 will represent the right hand component 7623 and the impulses directed to the sockets 437 will represent the left hand component 2376 which will be directed through plug connections 512 and 513 respectively to sockets 266 and 268 (Fig. 1*d*), and thence through the contacts of the column shift relay CS*u* to plug sockets 274 and 276. From sockets 274 plug connections 523 are made to sockets 278 associated with the RHB accumulator and from sockets 276 connections 524 are made to sockets 280 associated with the LHB accumulator.

Energization of a column shift relay CS*u*, CS*t*, etc. will cause energization of relay magnets Y*u*, Y*t*, etc. (Fig. 1*a*) in the order in which multiplying is taking place. This in turn will shift the related pair of contacts Y*u*2, Y*t*2, etc. so that, when cam contacts CC5 close, circuits will be directed through the column shift magnet containing the next higher significant figure and will skip the magnets related to orders in which zeros are present. The machine continues multiplying operations during which partial products are entered in succession into the LHB and RHB accumulators.

After a multiplying cycle has been effected for each significant multiplier digit, all of the magnets Y*u*, Y*t*, etc. will have been energized and all of the contacts Y*u*2, Y*t*2, will be in their shifted position. For the purposes of the present invention, a further set of contacts controlled by the Y magnets designated with the suffix 3 are provided, beginning with the magnet Y*t*. The contacts suffixed 3 are wired with their upper contacts in series and their lower ones in parallel with contacts suffixed 2. The arrangement is such that, when all but the last of the Y relays have been energized, a circuit will extend through these sets of contacts to energize relay R17. For example, if the first seven Y magnets have been energized, the circuit will extend from contacts CC5 in series through the lower contacts of the first seven contacts suffixed 2, thence to the lower contacts of the last contacts Y*tm*3, through relay R17. In other words, relay R17 is energized concurrently with the last effective column shift relay CS.

Near the end of the first multiplying cycle, relay R16 (Fig. 1*h*) will be energized through a circuit from line 200, contacts FC4, R17*b*, R15*d* (now closed), contacts CC8 and relay R16 to line 201. The holding circuit therefor will extend through contacts R16*a* and R17*b*. A second holding circuit extends through a wire 537 (Fig. 1*g*) to upper contacts R16*d* and contacts CC16. Energization of relay R16 will interrupt operation of the program stepping relays as long as multiplying operations are being performed, that is, until relay R17 is energized. To this end contacts R16*b* (Fig. 1*g*) open to interrupt the circuit to contacts CC11 and CC12 and the contacts R16*c* shunt contacts CC13 to maintain relays R44 and R45, so that they will remain energized throughout the multiplying operations. The shifting of contacts R16*d* prevents energization of relay R54 beyond the first multiplying cycle.

Relay R17, when energized, will close its contacts R17*a* (Fig. 1*i*) to provide a holding circuit for the relay through wire 536 (Figs. 1*h* and 1*g*) and contacts CC16. This energization of relay R17, as stated, occurs concurrently with the energization of the last column shift relay CS, so that the appropriate multiplying relay is selected and multiplying by the last digit will take place in the following machine cycle 7. Opening of contacts R17*b* (Fig. 1*h*) will deenergize relay R15 and will break one of the holding circuits of relay R16, which latter will continue energized until contacts CC16 in the second holding circuit open, so that relays R16 and R17 are deenergized together. When contacts CC11 close near the end of the last multiplying cycle, a circuit will be completed from line 200 (Fig. 1*g*), contacts R5*d* (shifted), contacts R16*b*, R19*b*, R20*d*, CC11, R52*c* (now closed), R44*b* (shifted), R50*b*, relay R48, relay R47*b* (shifted), to line 201.

Relay R48 will shift its contacts R48*d* to provide a holding circuit from line 200, contacts CC15 and R20*b*, R48*d*, second (H) winding of relay R48, contact R49*d* to line 201. The relays R47 and R48 are now both closed and will direct an impulse from contacts CC16 to contact R16*d*, R19*d*, R47*c* (now closed), R48*a* (now shifted) to the 3 socket 230, from which connection 525 is made to socket 232 for energization of relay R55 whose contacts R55*a* will control the operation of circuits during the third program cycle.

It will be noted in Fig. 1*g* that the program sequence circuits to sockets 230 is controlled by the set of five relays R45, R47, R48, R49 and R50 which through various combinations taking two at a time direct the impulse from contacts CC16 to the eject sockets 230. Thus, for program cycle 1 relays R47 and R50 control; for program cycle 2 relays R47 and R45 control; for program cycle 3 relays R47 and R48 control; for program cycle 4 relays R48 and R45 control; for program cycle 5 relays R48 and R49 control; for program cycle 6 relays R49 and R45 control; for program cycle 7 relays R49 and R50 control; and for program cycle 8 relays R50 and R45 control.

THIRD PROGRAM CYCLE

During this cycle the RH components of partial products are added to the LH components to obtain the complete product. This is effected by energization of selector relay S6 (Fig. 1*i*) through a plug connection 526 to one of the sockets 226 connected to contacts R55*a* so that the relay S6 is energized during the third program cycle or eighth machine cycle to close a group of contacts S6*a* (Fig. 1*f*) which are connected by plug wires 527 to plug sockets 210 of the RHB accumulator and through connection 528 to the plug sockets 280 (Fig. 1*d*) of the LHB accumulator. The circuit for transferring right hand components is traceable for a representative order as follows: from generator AC (Fig. 1*a*), wire 202, circuit breaker CC22 to CC24, wire 529 (Figs. 1*c*, 1*e*, 1*f*), emitter E2, group of wires 530, readout segment to positioned brush in the RHBRO device, related columnar socket 210, connection 527, contacts S6*a*, connection 528, socket 280 (Fig. 1*d*), contacts R86*b*, the accumulator magnet LHB1 to ground.

During this third program cycle, the amount *p* now standing in the total accumulator (as will be explained later) transfers to the LHA accumulator. For this transfer relay S12 is energized through a plug connection 533 (Figs. 1*g* and 1*i*) whose contacts S12*a* are connected between socket 214 (Fig. 1*f*) of the total accumulator through plug connection 534 and socket 280 (Fig. 1*d*) through a connection 535. At the end of the third program cycle, therefore, the total accumulator contains the amount $p$ and the LHA accumulator also contains this same value while the LHB accumulator contains the product $m$.

Advance of the card to the punches

While the multiplying operations just described are taking place (see Fig. 9) the record card which had been advanced past the sensing brushes into the tray of the punching machine is advanced to the punches and punching of the amount $n$ takes place as follows. During the second program cycle, an impulse to one of the contacts R54a (Fig. 1g) will extend from the related socket 226 through a plug connection 537a to plug socket 308 (Fig. 1h) designated Start Punching. This circuit extends through contact R87b (now closed) to relay R12, which latter will hold through its contacts R12d and R10b. The relay R87 is energized periodically at the beginning of each cycle through cam contacts CC26 (Fig. 1h), and the punch starting impulse will be effected during the period that this relay is energized.

It will be recalled that at the end of the first program cycle the record card in feeding into the tray of the punching machine closed the punch card lever contacts 120 (see also Fig. 4a). As a result, the relay R6 (Fig. 1h) is energized to shift its contacts R6b and complete a circuit from line 200, ejection contacts P3 (still colsed), contact R7d (now closed), R8b (also closed), contacts CC4, clutch magnet 143 of the punch unit, lower contacts R6b to line 201. Energization of this magnet will in the usual manner cause the card to be shifted toward the left as viewed in Fig. 4a to a position where the first column thereof is in line with the punches 147 (Fig. 4). During this movement of the card, the contacts P5, P3 and P1 are opened. At the extremity of this feeding stroke, contacts P2 (Figs. 4a and 1h) are shifted to energize relay R11 which will hold through contacts R11d and R10b. In the well known manner, the card carriage is provided with so-called skip bars to automatically advance the card from the first column punching position to present the first column in which punching is to be effected, which for the example under consideration is column 55, into which the highest digit of the amount $n$ is to be punched.

Accordingly, the carriage advances to present this column to the punches and then stops. The period required to advance the carriage is indeterminate with respect to the number of cycles required and, as stated, relay R12 was energized to actually start the punching operation under control of an impulse during the second program cycle. It will close its contacts R12b to complete a circuit traceable from line 200 (Fig. 1h), contacts R12b, the so-called floating cam contacts 154, the usual punch-non-punch switch NP, contacts of the switch SW, contacts R14b (normal), contacts R11b (now closed), wire 570 (Fig. 1f) to the common conductor 540 which through brushes 404 is now connected to the contact segment related to the card column 55 and the corresponding plug socket 406. This socket has a plug connection 541 to plug socket 220, thence through the readout device of the total accumulator (related to the highest order for amount $n$) to a group of wires designated 542 which extend (Fig. 1e) to the punch selecting magnets 543. As usual, energization of a selecting magnet 543 will close interposed contacts 571 (Fig. 1h) to energize the punch magnet 572. As a result, column 55 of the card will be punched with the appropriate digital value. As is usual, the card carriage will escape to the next column where a similar circuit will be completed to punch the next column and so on to complete the punching of the sum $n$. Thus, the program device initiates the feed of the card toward the punches and, when the selected column arrives in punching position, the actual punch selecting circuit is completed through the contacts of relays R11, R12 and the punch column selector.

As indicated in Fig. 9, this punching occurs while multiplying operations are proceeding as previously explained and is approximately at the rate of four columns for each cycle. When column 59 of the card arrives in punching position, the brushes 404 will connect the conductor 540 to the socket 406 related to column 59 to complete a circuit through connection 544 (Fig. 1i) to relay S14.

If this energization of relay S14 occurs at a time in a cycle prior to the closing of contacts CC14, the latter upon closure will complete a circuit from line 200 (Fig. 1g), contacts CC14, plug socket 296 from which a plug connection 545 (Fig. 1i) is made to contacts S14a (now closed), connection 546 to a socket of relay S5A and to line 201. This relay will close its contacts S5Aa to effect a holding circuit through contacts R52d (now closed). The second pair of contacts S5Ab will energize selector relay S5 which will accordingly be held through the same holding circuit and will control the following operations.

Subtracting $e+f$ from $c+d$

A circuit is now traceable from line 200 (Fig. 1g), contacts CC16, to the set of sockets 286 from which a plug connection 547 (Fig. 1i) is made to normally closed contacts S10a, connection 548 is made to contacts S5b (now closed) and further connection 549 is made to selector relay S8 and line 201. The inverting relay R25 is energized through contacts of relay S8 and through a circuit traceable from the group of sockets 286 (Fig. 1g), through plug connection 550 (Fig. 1i), contacts S8b, and connection 551, relay R25, to line 201. This relay closes contacts R25c (Fig. 1i), to transmit an impulse through contacts CC14a, plug socket 298 from which, through a connection 552, a so-called carry or fugitive one magnet 412 associated with the total accumulator is energized. Further plug connections are made through readout sockets 210 of the RHA accumulator (Fig. 1f), through connections 431 to contacts S8a, from which further connections 532 are made to the sockets 282 of the total accumulator TOT, so that during the rotation of the brush of emitter E2 (Fig. 1f) impulses will be transmitted through wires 530 and inverted through contacts R25a to transfer the complement of the $e+f$ amount standing in the RHA accumulator to the total accumulator and later in the carry period of the cyclic the magnet 412 in the well known manner will add a fugitive one in the units order position.

As indicated in Fig. 9, this transfer will occur in cycle 7 following the completion of punching of the amount $n$ so that at the end of the machine cycle 7 the amount $p$ will be standing in the total accumulator.

The punching in column 59, which is the last position in which the amount $n$ is punched, is directed through a so-called delay contact R87d of the punching circuit of this column which is traceable from line 200 to the emitter readout strip 540 (Fig. 1f) as already traced, thence to the brush 404 in column 59 to the related plug socket 406. From here a further connection 552 is made to a plug socket 321 to direct a circuit through contacts R87d which are closed at the end of a cycle through cam contacts CC26 (see Figs. 1 and 7), thence from socket 322, through connection 553, through contacts S5c, and a further connection 554 to units order socket 220 of the total accumulator and from here through the readout device to the punch selecting magnets 543. The punching of column 59 will incidentally escape the card carriage to present column 60 to the punches for reception of the $p$ amount after the complementary transfer into the total accumulator has been effected.

With the card in column 60 position, a circuit extends from the socket 406 related to column 60, through connection 555 (Fig. 1i) to energize relay S15 and this in turn through connection 556 from socket 296 (Fig. 1g), through contacts S15a will energize relay S10A through connection 557 to thereby set up the usual holding circuit through contacts S10Aa and energize the selector relay S10. Relay S10 will cause opening of its contacts S10a (Fig. 1i) to deenergize the selector relay S8 to prevent repeated transfer of the amount from the RHA accumulator to the total accumulator.

The column 60 socket 406 is further connected through plug connection 558 (Fig. 1f), through delay contacts R87a and connection 559, through selector relay contacts S10c, through the total accumulator readout socket 220, through connection 560 so that the punching of the first digit of the $p$ amount is delayed to the end of the cycle in which the complement transfer takes place.

Briefly, then, the arrival of the record card in column 59 position will cause the initiation of a transfer on the next cycle following the one in which the card arrived in the selected columnar position. When the card steps to the next punching position, circuits are set up to punch the result of the transfer immediately upon completion of such transfer cycle. These punching and transfer cycles are independent of the multiplying operations which are continuing at this time. In Fig. 9 five multiplying cycles are indicated with the complementary transfer being effected concurrently with the last of the multiplying cycles. This relationship is not fixed, as additional multiplying cycles may take place where the multiplier contains more significant digits.

Punching in column 60 will cause carriage escapement to column 61 and from here the remainder of the $p$ amount is punched in the usual manner through direct connections between sockets 220 and 406 to punch the amount $p$ in columns 60 to 63. When the card reaches its column 64 position, a circuit is completed from the related socket 406 through connection 561 (Fig. 1i) to plug socket 324 of relay R46 and to line 201. This relay closes its contacts R46d to provide a holding circuit through contacts CC25. It also opens its contacts R46b (Fig. 1i) to break the holding circuit of relay R18 which in turn opens its contacts R18c to break the circuit to relay R19, allowing its contacts R19b (Fig. 1g) to reclose. Through a plug connection 573 between a third program cycle socket 226 (Fig. 1g) of contact R55a and the socket 310 (Fig. 1i) relays R18, R19 and R21 are energized and held to prevent further advance of the program relays until the selected operations have been carried out.

In Fig. 1i a further connection 575 is made between socket 326 and contacts S18a and from here connection 576 is made to the units order socket 220 (Fig. 1f) of the total accumulator readout device. Through this circuit the last digit of the amount $p$ is punched, but its completion awaits the closure of contacts S18a during the fourth program cycle.

FOURTH PROGRAM CYCLE

If the operations effected during program cycle 3 were completed before the amount $p$ has been fully punched, relay R18 would have been picked up as explained to prevent further stepping of the program counter, and the energization of relay R46 when the card reaches its column 64 position will enable the resumption of the program stepping. In the case where punching of $n$ and $p$ is completed before completion of the program cycle 3, the card carriage remains in the column 64 position to hold relay R46 energized and its contacts R46b open so that, when during the program cycle the impulse is sent to the program stepping sockets 310, this impulse will be ineffective to pick up relay R18 and the count advances to its program cycle 4 condition which is as follows: through contacts R5d, R16b, R19b, R20d, CC11 and R52c (Fig. 1g), relays R41, R42 and R43 are energised, resulting in deenergization of relay R47 due to the opening of contacts R43b. Shifting of contacts R41b will cause relays R44 and R45 to become energized and held through CC13. As a result of this and with relays R48 and R45 now both energized, a circuit will be completed to send an impulse from contacts CC16, R16d, R19d, R48c, R49a and R45a to the 4 socket 230 from which a connection is made to the corresponding socket 232 to energize relay R56.

This relay will close a set of contacts R56a from which a connection 563 is made to the sockets 224 (Fig. 1i) of the RHA, RHB, total accumulator reset magnets 223, so that these three accumulators will reset during the program cycle 4. During this cycle transfer of the amount $m$ standing in the LHB accumulator to the LHA is effective. This is brought about by a plug connection 564 from one of the sockets 226 to energize relay S16 (Fig. 1i) whose contacts S16a are connected between the readout sockets 212 of the LHB, through connections 565, 566 (Figs. 1e and 1d) whereby through familiar circuits the amount standing in the LHB accumulator is transferred to the LHA accumulator. In Fig. 1i relay S18 is energized in parallel with relay S16 through connection 579 and the resultant closure of its contacts S18a in the column 64 punching circuit will cause the last column of the amount $p$ to be punched and the card escapes to its column 65 position. Thus, punching of column 64 is delayed until program cycle 4 has been initiated.

Concurrent with the transfer, the punching of the amount $m$ is initiated upon arrival of column 65 in punching position and is effected through connections 567 between sockets 218 (Fig. 1e) of the LHB accumulator and the punch sockets 406 (Fig. 1f) in columns 65 to 72 inclusive.

FIFTH PROGRAM CYCLE

At the end of program cycle 4, relay R49 (Fig. 1g) is energized through contacts CC11, R52c, R44b (shifted), R48b (shifted), relay R49, contacts R47b to line 201. Thus, when contacts CC16 again close, an impulse is directed through contact R16d, R19d, R48c, R49a to the 5 socket 230 from which connection is made to energize relay R57, resulting in closure of its contacts R57a and transmission of an impulse to the sockets 226 associated with this relay. Transfer of the amount m to the LHA accumulator during the fourth program cycle obtained the final result M therein, and the punching of this amount will be controlled through the operation of the fifth cycle of the program. Connection 566 is made from one of the contacts R57a to the socket 302 (Fig. 1i) designated Last Cycle to energize relay R20, which will close its contacts R20c (Fig. 1h) to hold through contacts FC2. In Fig. 1g the relay R20 opens its contacts R20d to prevent further energization of any program relays. It also opens contacts R20b so that, when contacts CC15 open, all the holding circuits to the several program relays will be broken and the device in effect will be reset. Of these relays, relay R52 will open its contacts R52d (Fig. 1i) dropping out any holding circuits for the selectors when the contacts CC18 open.

A plug connection 567 (Fig. 1g) is made from another of the contacts R57a to socket 304 (Fig. 1h) labeled Auto Start and a circuit through this connection will energize R9, which will hold through its contacts R9d and cam contacts FC4. As a result, contacts R9c close (Fig. 1h) to complete a circuit through contacts CC6, FC1, R5a, R1b, R51b, R18b, R9c to relay R3. This relay, as previously explained, will bring about the feeding of the second card past the sensing brushes, and during the resultant two machine cycles as indicated in Fig. 9 new data derived from the second card will be entered into the accumulators as explained for the first card feeding cycle. Also in the second half of this feeding cycle there will be effected the transfer of c to d and f to e and also the reset of the RHA accumulator. While these functions are being carried out, punching of M is also taking place and following immediately after punching of m; that is, when the card escapes to its column 73 position, the punching circuits extend from column 73 socket 406 (Fig. 1f), through representative connection 580 (Fig. 1e) to the sockets 218 of the LHA readout device, and thence to the punch selecting magnets in the well known manner.

When the card reaches its column 80 position, the circuit therein extends from column 80 socket 406 (Fig. 1f) through connection 581 (Fig. 1i) to energize relay R22 and hold it until contacts CC25 close. This circuit branches through contacts R22c and connection 582 (Fig. 1e) to the socket 218 of the last order of the LHA accumulator, so that as the last digit of the M amount is punched relay R22 is energized therewith and opens its contacts R22b (Fig. 1i) in the circuit of relay R18.

After the fifth program cycle setting and subsequent restoration of the program relays, the impulse through contacts CC12 (Fig. 1g) picks up relay R40 in cycle 12 in the same manner as explained for cycle 1 to set up the First Program cycle which controls the transfers in the now ensuing card feed cycles. As before, the circuit through connection 519 (Fig. 1i) causes energization of relay R18. Cyclic operations thereupon become idle and await punching of column 80, at which time contacts R22b open to drop out relay R18. Of course, if the last punching were completed before the card feed cycle occurred relay R22 would be energized before the impulse to connection 519 and no delay would occur.

As the card escapes from the column 80 position, contacts P5 (Fig. 1h) close to energize the eject magnet 151 to initiate removal of the card from the carriage in the well known manner and contacts P3 will close to advance the second card into punching position.

*Stop key.*—When it is desired to stop the machine at the end of operations for any card, key contacts 585 (Fig. 1h) are closed to energize relay R1 which closes its contacts R1c to hold through contacts R2b and opens its contacts R1b in the pickup circuit of relay R3, so that this relay will not be automatically energized to initiate feeding of a new card and the machine will operate idly. Resumption is effected through closure of start key contacts ST which will energize relay R2 through shifted contacts R1d and contacts R2b will deenergize relay R1, so that relay R3 can become energized to resume operations.

*Non-punching.*—In a group of cards there may be certain ones for which it is not desired to punch results and for such cards an X hole is punched in an appropriate column sensed by the brushes 586 (Fig. 1h) in advance of feeding of the card past the data sensing brushes. Through a plug connection 587 a circuit is completed upon occurrence of such a hole, traceable from line 200, contacts FC1, R5c, R1b, R51b, R18b, R9c, brush 586, connection 587, socket designated Non-punching and relay R13 to line 201. Relay R13 closes its contacts R13d to hold through contacts P2. When the carriage reaches its eject position and contacts P3 close, relay R7 will be energized and its contacts R7a closed to direct a circuit from line 200, contacts P2, R13d, R7a, R14d and relay R14 to line 201. This relay shifts contacts R14d to hold through contact R8a until the card reaches its last column position. It also shifts its contacts R14b so that the circuits which were previously directed through the upper contacts to the common conductor 540 of the punch column selector now go to the punch magnet 572 directly and effect automatic spacing operations in the well known manner. Briefly, the circuit extends from line 200, contacts R12b, 154, switches NP and SW, lower contacts R14b and magnet 572 to line 201. Operation of magnet 572 spaces the carriage and incidentally opens contacts 154, and upon their reclosure the circuit is again completed and another spacing effected and so on.

*Operation initiated by cycle control.*—In Fig. 1a the contacts Yu4, Yt4, etc. are provided with plug sockets 588 from any of which a plug connection may be made to a selector relay or other controlled device to effect its operation at a selected multiplying cycle. Thus, for a particular problem it may be judged in advance that a desired cross addition can be carried out starting at a selected step in the multiplying, in which case an impulse from contacts CC16a will complete the initiating circuit when such stop is reached and will be repeated in following multiplying steps until the Y magnets are deenergized.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable multiplying machine, a plurality of relays, energizing circuits therefor, means for rendering said circuits selectively effective to cause energization of a different pair of said relays during each of a succession of machine cycles, contacts for each relay, a series of plug sockets, one for each of said different pairs of relays, a source of current, a partially established circuit connection between each socket and one side of said current source, each including contacts of the pair of related relays arranged so that upon energization of any of said pairs of relays the related socket will be connected to said one side of current source and current responsive devices connected between said sockets and the other side of said current sources.

2. The invention set forth in claim 1 in which the first named means comprises machine controlled contacts normally effective in each successive cycle to energize a different pair of relays, and means for suppressing the effectiveness of said contacts during predetermined cycles, whereby the pairs of relays will be energized during an interrupted succession of cycles.

3. The invention set forth in claim 2, in which further means is provided to break the circuit connection to any of said sockets after its completion and during the next following machine cycle.

IOINO GHERTMAN.
EDMOND FEBVRE.

REFERENCES CITED

The following references are of record in the file of this patent:

UNITED STATES PATENTS

| Number | Name | Date |
|---|---|---|
| 2,062,119 | Bryce | Nov. 24, 1936 |
| 2,090,103 | Bryce | Aug. 17, 1937 |
| 2,165,230 | Cunningham | July 11, 1939 |
| 2,170,543 | Bryce | Aug. 22, 1939 |
| 2,172,073 | Ziguelde | Sept. 5, 1939 |
| 2,178,064 | Bryce | Oct. 31, 1939 |
| 2,237,136 | Dickinson | Apr. 1, 1941 |
| 2,328,610 | Bryce et al. | Sept. 7, 1943 |
| 2,403,005 | Lake et al. | July 2, 1946 |